(12) United States Patent
Ishizuka et al.

(10) Patent No.: US 7,260,222 B2
(45) Date of Patent: *Aug. 21, 2007

(54) SHARED DATA REFINING DEVICE AND SHARED DATA REFINING METHOD

(75) Inventors: Hirokazu Ishizuka, Tokyo (JP); Akihiro Yamamura, Tokyo (JP)

(73) Assignees: National Institute of Information and Communications Technology, Tokyo (JP); Communications Research Laboratory, Independent Administrative Institution, Tokyo (JP)

( * ) Notice: Subject to any disclaimer, the term of this patent is extended or adjusted under 35 U.S.C. 154(b) by 1016 days.

This patent is subject to a terminal disclaimer.

(21) Appl. No.: 10/363,266

(22) PCT Filed: Jul. 9, 2002

(86) PCT No.: PCT/JP02/06961

§ 371 (c)(1),
(2), (4) Date: May 14, 2003

(87) PCT Pub. No.: WO03/007543

PCT Pub. Date: Jan. 23, 2003

(65) Prior Publication Data

US 2003/0188242 A1    Oct. 2, 2003

(30) Foreign Application Priority Data

Jul. 10, 2001   (JP)   ............... 2001-208716

(51) Int. Cl.
*H04K 1/00*   (2006.01)

(52) U.S. Cl. .................. 380/255; 380/257; 380/28

(58) Field of Classification Search .............. 380/255, 380/257, 28
See application file for complete search history.

(56) References Cited

OTHER PUBLICATIONS

SPRiNG: synchronized random numbers for wireless securityPepyne, D.L.; Yu-Chi Ho; Qinghua Zheng;Wireless Communications and Networking, 2003. WCNC 2003. 2003 IEEEvol. 3, Mar. 16-20, 2003 pp. 2027-2032 vol. 3.*
Secret Telephony as a Historical Example of Spread-Spectrum CommunicationBennett, W.;Communications, IEEE Transactions on [legacy, pre—1988]vol. 31, Issue 1, Jan. 1983 pp. 98-104.*
Methodology for network security designGraft, D.; Pabrai, M.; Pabrai, U.;Communications Magazine, IEEEvol. 28, Issue 11, Nov. 1990 pp. 52-58.*

(Continued)

*Primary Examiner*—David Jung
(74) *Attorney, Agent, or Firm*—Oblon, Spivak, McClelland, Maier & Neustadt, P.C.

(57) ABSTRACT

Each of a transmitter (1) and a receiver (2) divides temporarily-shared data into one or more purification blocks and one or more disposable blocks, and mixes each purification block so as to enlarge a Hamming distance between corresponding purification blocks being held by the transmitter (1) and the receiver (2) by using a Hamming distance amplification effect. The transmitter (1) Vernam-encrypts the mixed data with the disposable data and transmits the mixed data to the receiver (2), and the receiver (2) decrypts the received Vernam-encrypted data by using a disposable block owned thereby, and compares the Hamming distance between the purification block owned thereby with the mixed data with a predetermined value so as to judge whether each purification block can be shared between the transmitter (1) and the receiver (2).

19 Claims, 12 Drawing Sheets

OTHER PUBLICATIONS

Eli Biham, et al., "A Proof of the Security of Quantum Key Distribution", Proceedings of the 32$^{nd}$ Annual Symposium on Theory of Computing, Proceedings of the Annual ACM Symposium on Theory of Computing, IEEE, XP-02981935, May 21-23, 2000, pp. 715-724.

Peter W. Shor, "Fault-Tolerant Quantum Computation", Foundations of Computer Science, IEEE Comput. Soc., XP-010202848, Oct. 14-16, 1996, pp. 56-65.

Markus Grassl, "Methods of Quantum Error Correction", Circuits and Systems, ISCAS 2000, vol. 1, XP-010503305, May 28-31, 2000, pp. 1740-1743.

Charles H. Bennett et al.: "Experimetnal quantum cryptography" Journal of Cryptology, vol. 5, No. 1, pp. 3-28 1992.

Hoi-Kwong Lo et al.: "Quantum cryptology" Introduction to Quantum Computation and Information, pp. 76-119 1988.

* cited by examiner

FIG.8A

PURIFICATION BLOCK Axr

| FIRST HALF | SECOND HALF |
|---|---|
| 1010 ··· 001 | 0001 ··· 100 |

XOR

| 0001 ··· 100 |

| 1011 ··· 101 | = VERNAM-ENCRYPTED DATA X

FIG.8B

PURIFICATION BLOCK Ayr

| FIRST HALF | SECOND HALF |
|---|---|
| 1011 ··· 001 | 0101 ··· 100 |

XOR

| 0101 ··· 100 |

| 1010 ··· 111 | = VERNAM-ENCRYPTED DATA Y

| VERNAM-ENCRYPTED DATA X | 1011 ··· 101 |

XOR

| VERNAM-ENCRYPTED DATA Y | 1010 ··· 111 |

| VERIFICATION DATA | 0001 ··· 010 | b1-th BIT →
b2-th BIT →

SHARED DATA REFINING DEVICE AND SHARED DATA REFINING METHOD

FIELD OF THE INVENTION

The present invention relates to a shared data purifying apparatus for and shared data purifying method of purifying shared data containing errors so as to produce errorless shared data for communication using quantum cryptography or the like.

BACKGROUND OF THE INVENTION

For example, a prior art error correction method for use with quantum cryptography is disclosed in "INTRODUCTION TO QUANTUM COMPUTATION AND INFORMATION" (EDITOR: Hoi-Kwong Lo, et al.). Some protocols defining procedures are proposed to implement the quantum cryptography, and among them BB84 protocol is currently assumed to be a standard protocol for the quantum cryptography. After that, this protocol has been improved and is provided as a protocol effective even in noisy realistic communication paths. The improved BB84 protocol described in "Experimental Quantum Cryptography" (C. H. Bennett, F. Bessette, G. Brassard, L. Salvail and J. Smolin, J. Cryptology Vol.5, pp.3-28) roughly consists of two parts: a first procedure for sharing physically-safe initial data using a quantum communication path and a second procedure for correcting errors included in the initial data by using an error correction method on a public line (i.e., a classical path), and for reducing a volume of information leaking to third parties in terms of information theory. The first procedure of roughly sharing data by using a quantum communication path is unrelated directly to the present invention. The BB84 protocol is referred to as this improved BB84 protocol from here on. The present invention relates to "the second procedure for correcting errors included in the initial data, and for reducing a volume of information leaking to third parties in terms of information theory". The prior art method can be explained as follows.

With the current state of the art, the shared data that appear in the first half of the BB84 protocol include errors that occur at a rate of about 1%. These errors result from the accuracy or the like of the apparatus that is affected by fluctuations, such as thermal noise, and reflected light, which appear in the communication path. Third party involvement can also cause an error. Although the biggest feature of the quantum cryptography is that it is possible to detect third party involvement as an error, that may be true under ideal circumstances. As previously mentioned, it is impossible at this stage to judge whether the occurrence of an error is caused by a leakage that blends into the level of a rate of errors caused spontaneously or by third party involvement. Furthermore, although according to the BB84 protocol the transmitter roughly shares data with the receiver, the system does not properly function in most cases if the shared data include errors that occur at a rate as much as 1%. When the shared data is used as key data in common key cryptographic scheme, for example, it is to be understood at once that even a single-bit error is not included in the shared data. To solve this problem, there has been provided a method of removing errors while preventing information from leaking to wiretappers as much as possible, simultaneously throwing away information leaked during quantum communications, and sharing only safe data between the transmitter and the receiver. This method is called error correction and privacy amplification.

The principle of the error correction method is simple. In accordance with the method, it is assumed that there is shared data containing some errors between the transmitter and the receiver. The shared data is divided into some blocks, and single-bit parities are compared with each other for each block. At this time, because a public line is used, it can be generally assumed that the parity information can be also leaked to wiretappers. Therefore, in this case the volume of leaked information is 1 bit in terms of information theory, and 1 bit of the roughly-shared data being held now is thrown away to make them balance each other out. The processing on blocks whose parities agree with those of corresponding blocks is then terminated for the time being. Each block whose parity does not agree with that of the corresponding block is further divided into equal halves, and a similar parity check is then performed on each of them. Two-branch searching is repeatedly carried out until an erroneous bit is detected, and this erroneous bit is finally corrected. Thus, (the number of parity bits used for the two-branch searching+1) bits are thrown away, and remaining bits are defined as a candidate of the shared information. This is because when an even number of errors are included in each block of the shared data the parities agree with each other between the shared data being held by the transmitter and that being held by the receiver and no error cannot be detected, and therefore in accordance with the prior art method bits of the shared data are appropriately inverted and erroneous bits are surely removed by repeating the same processing from the beginning several times. In accordance with the privacy amplification method, even if the above-mentioned error correction is carried out, there is a possibility that there exist bits that have not been detected as erroneous bits even when a wiretapper taps the shared data, though the bits are few in number. To prevent the possibility of part of the information being tapped, each of the transmitter and the receiver carries out a process of further improving the safety by implementing a hash operation on the shared information and assuming the hash value as final shared data. This method is the so-called privacy amplification method.

A t-resilient function for use in the prior art method will be explained hereafter.

f is a Boolean function: $Z\_2^n \to Z\_2^m$ (n>m), where $Z\_2$ is $Z_2$ and $2^n$ is the n-th power of 2.

By definition, the fact that f is balanced (or equitable) means that a reverse image $f^{-1}(y)$ of f has $2^{\{n-m\}}$ elements for all m-bit strings y.

This definition is equivalent to the fact that when y is an output and an input x is chosen at random, P(y) becomes $2^{\{-m\}}$ for all m-bit strings y, assuming that the probability of f(x)=y is P(y). Then, assume that t bits of the input x input to f are fixed. In other words, assume that $$x\_\{i\_1\}=c\_1, \ldots, x\_\{i\_t\}=c\_t$$

where $x\_\{i\_1\}$ is $x_{i1}$ and $c\_1$ is $c_1$, and $x\_\{i\_t\}$ is $x_{it}$ and $c\_t$ is $c_t$.

Assume that $P(y|x\_\{i\_1\}=c\_1, \ldots, x\_\{i\_t\}=c\_t)$ is the probability of f(x)=y on condition that $x\_\{i\_1\}=c\_1, \ldots, x\_\{i\_t\}=c\_t$.

By definition, the fact that f is correlation-immune of order t means that $P(y|x\_\{i\_1\}=c\_1, \ldots, x\_\{i\_t\}=c\_t)=P(y)$ is established for all x, y, $c\_1, c\_2, \ldots,$ and $c\_t$.

In the above description, $2^{\{-m\}}$ means $2^{-m}$.

It is to be understood through intuition that even though t bits of the n-bit string x has come to light to a wiretapper, the probability that the wiretapper can estimate f(x)=y is made to become $P(y)=2^{-m}$ after making f act on the n-bit string x. This probability is the same as that in the case where nothing has to come to light to the wiretapper. In other words, the probability is $2^{-m}$. Regardless of whether or not t bits of the n-bit string x has come to light to the wiretapper, an m-bit shared key has an m-bit entropy (the estimated probability is $2^{-m}$) by making f act on the n-bit string x when viewed from the wiretapper.

By definition, the fact that f is a t-resilient function means that f is balanced and is correlation-immune of order t.

This definition is equivalent to the fact that $P(y|x_{i\_1}=c\_1, \ldots, x_{i\_t}=c\_t)=2^{-m}$ is established for all possible variables.

It is to be understood through intuition that f is made to act on the n-bit string x even if some bits (t bits or less) of them have come to light to the wiretapper, so that the bit length of the shared key is shortened from n bits to m bits.

At this time, because some bits of x (i.e., the n-bit string) have come to light to the wiretapper, the probability of estimating the n-bit string x becomes smaller than $2^{-n}$ when viewed from the wiretapper. In other words, the complete safety is not achieved (the complete safety of the n-bit string x means that the probability of estimating the n-bit string x must be just $2^{-n}$).

On the other hand, for $y=f(x)$ (i.e., the m-bit string), the probability of the wiretapper estimating y is just $2^{-m}$. In other words, there is entropy of m bits.

Therefore, t is assumed to be a maximum of the number of bits that can be tapped by Eve in the quantum communication while being buried in errors. Accordingly, the value of t must be determined according to the error rate.

Therefore, if n is determined, t is determined according to the error rate, the t-resilient function is constructed, and the communication protocol is designed so that m is sufficiently large, even if some bits are leaked to a wiretapper during initial key exchanging, the complete safety (the complete safety intuitively means that the probability that the wiretapper estimates a key of m bits must be just $2^{-m}$ if it is assumed that m to be a security parameter) can be achieved by using the t-resilient function.

By the way, a method of constructing the t-resilient function may be known to the wiretapper. In other words, the t-resilient function is public information.

A problem encountered with the prior art method is that while a t-resilient function is made to act on data to be transmitted to improve the safety of transmission, there doesn't exist a proper method of constructing the t-resilient function in all cases, depending on the bit length of the input data, the output bit length, and security parameters.

The present invention is proposed to solve the above-mentioned problem, and it is therefore an object of the present invention to provide a method that can deal with all the above-mentioned cases by using a general function, such as SHA-1, other than t-resilient functions.

It is another object of the present invention to provide a method that can make the safety when sending and receiving data result in the safety of the Vernam cipher encryption, and that provides higher safety in terms of information theory.

DISCLOSURE OF THE INVENTION

In a shared data purifying apparatus in accordance with the present invention, after mixing each purification block by using a Hamming distance amplification effect, a transmitter Vernam-encrypts each purification block with disposable data and transmits it to a receiver.

As a result, the shared data purifying apparatus offers an advantage of reducing the risk of data being tapped.

In a shared data purifying apparatus in accordance with the present invention, each of a transmitter and a receiver (i.e., a shared data purifying apparatus) divides temporarily-shared data into one or more purification blocks and one or more disposable blocks, so that a Hamming distance between corresponding purification blocks being held by the transmitter and the receiver is enlarged by using a Hamming distance amplification effect.

As a result, the shared data purifying apparatus offers an advantage of easily determining whether temporarily-shared data being held by the transmitter is identical with or different from that being held by the receiver.

BRIEF DESCRIPTION OF THE FIGURES

FIG. 8A is a diagram for explaining a procedure for generating a Vernam-encrypted block X from a purification block in accordance with embodiment 3 of the present invention;

FIG. 8B is a diagram for explaining a procedure for generating a Vernam-encrypted block Y from a purification block in accordance with embodiment 3 of the present invention;

PREFERRED EMBODIMENTS OF THE INVENTION

In order to explain the present invention in greater detail, the preferred embodiments will be described below with reference to the accompanying figures.

Embodiment 1

Figure 1:
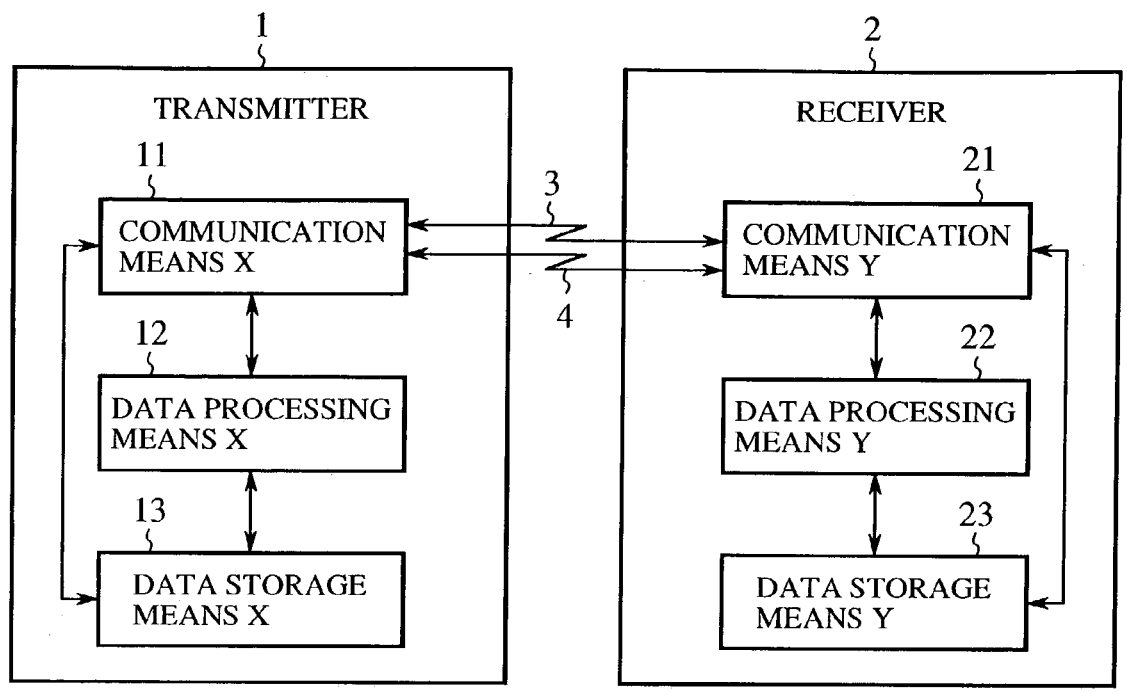
FIG. 1 is a diagram showing a shared data purifying system in accordance with embodiment 1 of the present invention.
Figure 2:
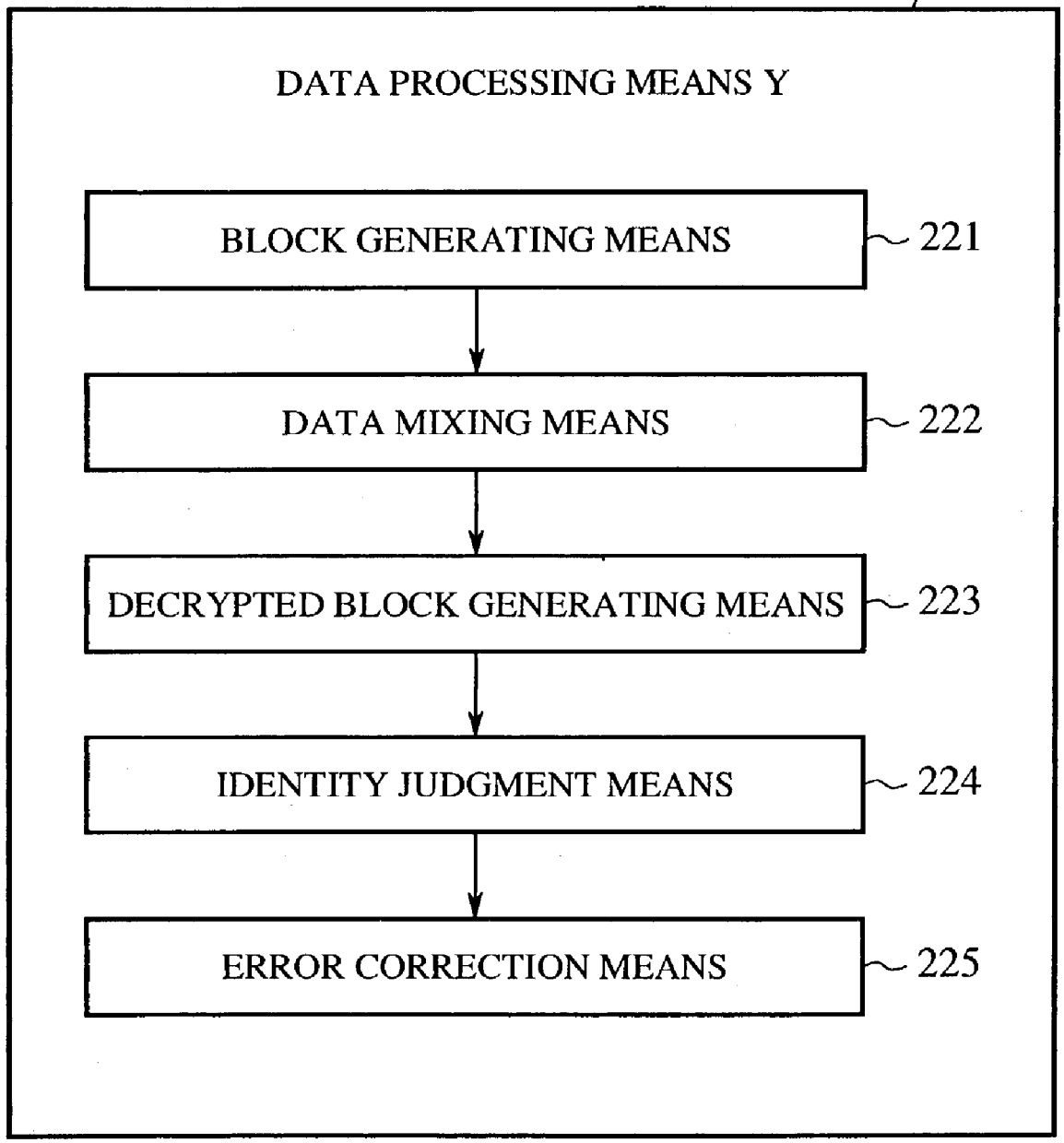
FIG. 2 is a block diagram showing a data processing means Y of the shared data purifying system in accordance with embodiment 1 of the present invention.
Figure 3:
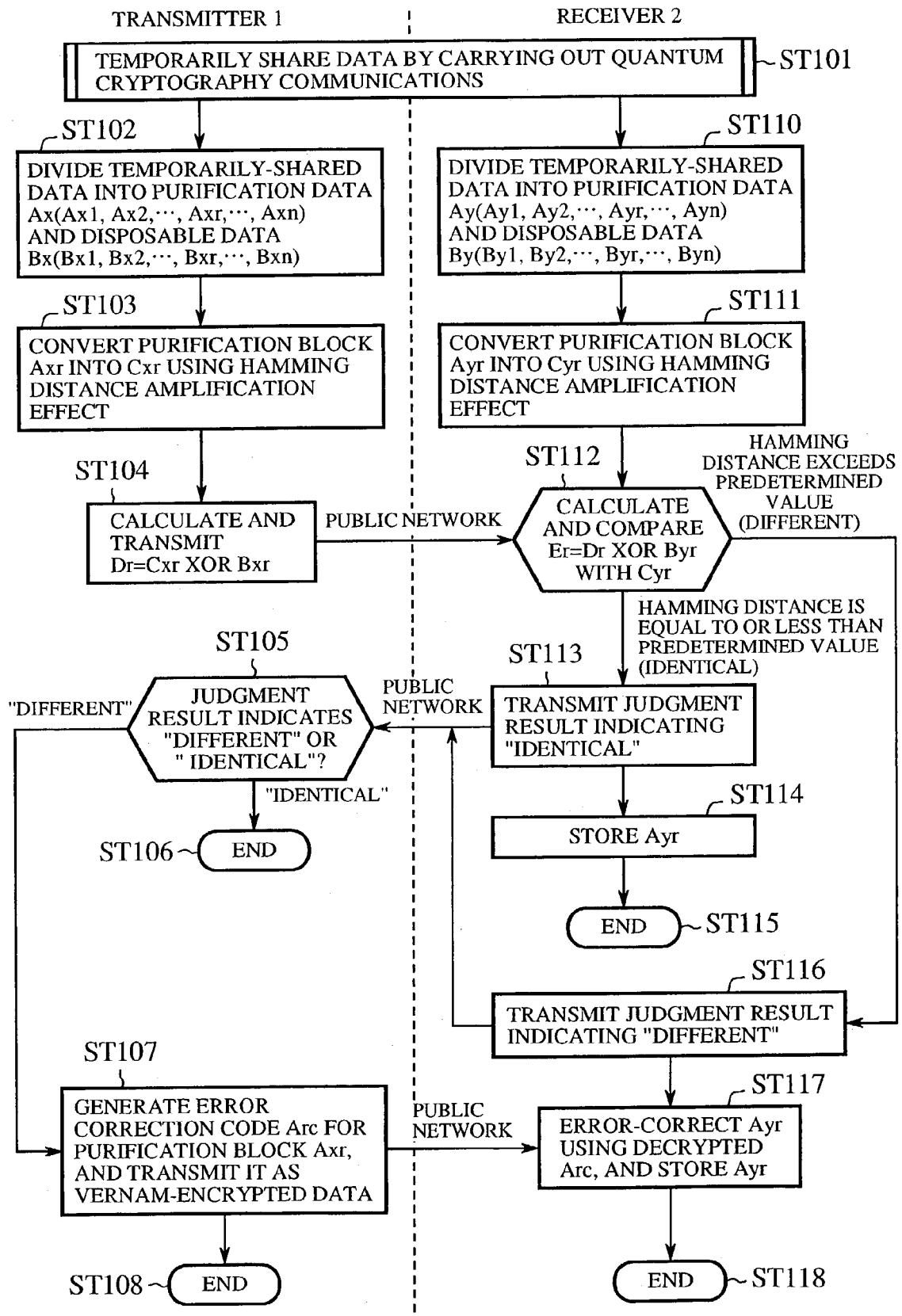
FIG. 3 is a flow chart showing an operation of the shared data purifying system in accordance with embodiment 1 of the present invention.
Figure 4A:
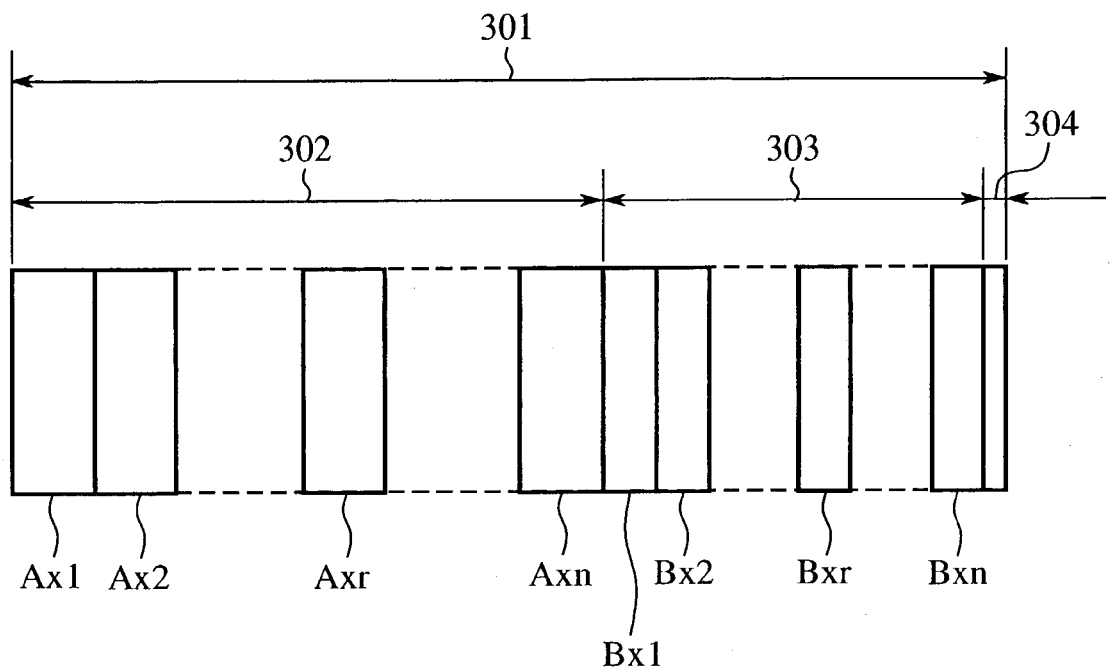
FIG. 4A is a diagram showing division of temporarily-shared data X into purification data and disposable data in accordance with embodiment 1 of the present invention.
Figure 4B:
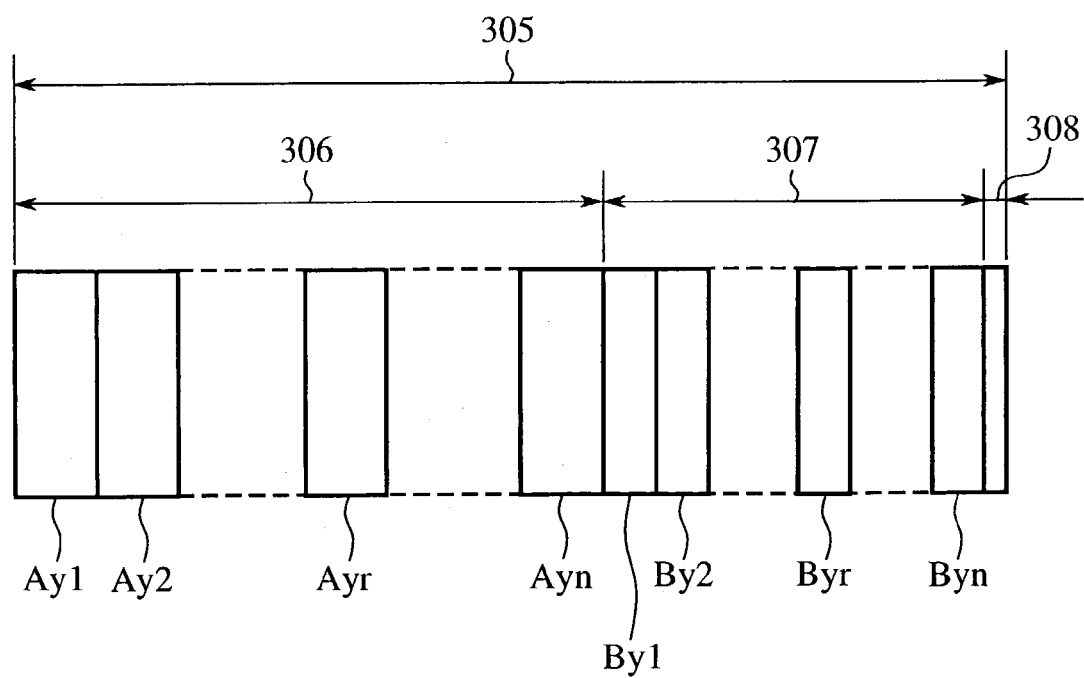
FIG. 4B is a diagram showing division of temporarily-shared data Y into purification data and disposable data in accordance with embodiment 1 of the present invention.

FIG. 1 is a diagram showing a shared data purifying system according to this embodiment, FIG. 2 is a block diagram of a data processing means of this shared data purifying system, FIG. 3 is a flow chart showing an operation of this shared data purifying system, and FIGS. 4A and 4B are diagrams showing division of temporarily-shared data X and Y into purification data and disposable data.

In FIG. 1, reference numeral 1 denotes a transmitter, reference numeral 2 denotes a receiver, reference numeral 3 denotes a quantum communication line that connects the transmitter 1 with the receiver 2, and reference numeral 4 denotes a public network that connects the transmitter 1 with the receiver 2.

In addition, reference numeral 11 denotes a communication means X included in the transmitter 1, which is connected with a communication means Y 21 included in the receiver 2. Each of the communication means X 11 and the communication means Y 21 can contain both a quantum communication means and a public communication means.

The quantum communication line 3 has a high possibility that errors of about 1 percent occur during transmission of data. In the public network 4, an error correction code, such as a Reed-Solomon code, is added to data by either of the communication means X 11 and the communication means Y 21, and data can be corrected even if the data includes errors.

Reference numerals 12 and 22 denote a data processing means X and a data processing means Y that are included in the transmitter 1 and the receiver 2, respectively, each of them consisting of a CPU, a RAM, and so on. Reference numerals 13 and 23 denote a data storage means X and a data storage means Y that are included in the transmitter 1 and the receiver 2, respectively, each of them consisting of either a volatile memory such as a RAM or a nonvolatile memory such as a flash memory or a hard disk drive.

In FIG. 2, reference numeral 221 denotes a block generating means, reference numeral 222 denotes a data mixing means, reference numeral 223 denote a decrypted block generating means, reference numeral 224 denotes an identity judgment means, reference numeral 225 denotes an error correcting means, and these components are included in the data processing means Y 22.

The receiver 2 is a shared data purifying apparatus.

Next, an operation of the shared data purifying system will be explained with reference to the flow chart of FIG. 3.

First of all, in step 101, the communication means X 11 transmits data for transmission stored in the data storage means X 13 of the transmitter 1 to the receiver 2 by using quantum cryptography communications through the quantum communication line 3. The receiver 2 receives this data by way of the communication means Y 21 and then stores the data in the data storage means Y 23. As a result, although the transmitter 1 and the receiver 2 share the data for transmission with each other, there is a possibility that this shared data in the transmitter 1 is not completely identical to the shared data in the receiver 2 due to errors that occur while the shared data is transmitted from the transmitter 1 to the receiver 2 or trapping by a third party. This is expressed by "temporary sharing" in FIG. 3. Hereafter, the data for transmission stored in the data storage means X 13 is referred to as temporarily-shared data X and the data for transmission stored in the data storage means Y 23 is referred to as temporarily-shared data Y.

The transmitter 1, in step 102, divides the temporarily shared data X, which are temporarily shared in step 101, into purification data Ax and disposable data Bx used to generate Vernam-encrypted data, as shown in FIG. 4A, and the receiver 2, in step 110, divides the temporarily shared data Y, which are temporarily shared in step 101, into purification data Ay and disposable data By used to generate Vernam-encrypted data, as shown in FIG. 4B. FIG. 4A is a diagram showing the division of the temporarily shared data X. In the figure, reference numeral 301 denotes the temporarily shared data X, reference numeral 302 denotes the purification data Ax, reference numeral 303 denotes the disposable data Bx, and reference numeral 304 denotes a remainder. Furthermore, FIG. 4B is a diagram showing the division of the temporarily shared data Y. In the figure, reference numeral 305 denotes the temporarily shared data Y, reference numeral 306 denotes the purification data Ay, reference numeral 307 denotes the disposable data By, and reference numeral 308 denotes a remainder. The data processing means X 12 carries out the division of the temporarily-shared data X, and the data processing means Y 22 (i.e., a block generating means) carries out the division of the temporarily-shared data Y.

In addition, the purification data Ax of the temporarily shared data X is divided into n purification blocks Axr (r=1 to n) each having an equal bit number P, and the disposable data Bx is divided into n disposable blocks Bxr (r=1 to n) each having an equal bit number Q. Similarly, the purification data Ay of the temporarily shared data Y is divided into n purification blocks Ayr each having an equal bit number P, and the disposable data By is divided into n disposable blocks Byr each having an equal bit number Q. The plurality of purification blocks Axr and the plurality of disposable blocks Bxr are stored in a RAM within the data processing means X 12, and the plurality of purification blocks Ayr and the plurality of disposable blocks Byr are stored in a RAM within the data processing means Y 22. As an alternative, the plurality of purification blocks Axr and the plurality of disposable blocks Bxr can be stored in the data storage means X 13, and the plurality of purification blocks Ayr and the plurality of disposable blocks Byr can be stored in the data storage means Y 23.

Because the number of bits of the temporarily shared data X is equal to that of the temporarily shared data Y, each of them can be L bits, as can be seen from FIGS. 4A and 4B, the number of blocks n into which each of Ax, Bx, Ay, and By is divided can be obtained from the following equation.

$$L = (P+Q) \cdot n + \alpha \ (\alpha < P+Q)$$

In this case, the remainder of $\alpha$ bits is not used. The division is thus carried out according to such a predetermined division rule.

The rate of errors that occur between the purification blocks Axr and Ayr at the same suffix r and between the disposable blocks Bxr and Byr at the same suffix r depends on the quality of the quantum communication line 3 and can be assumed to be about 1 percent.

Steps 103 and later of the transmitter 1 are carried out in parallel with one another for each suffix r (r=1 to n), and steps 111 and later of the receiver 2 are also carried out in parallel with one another for each suffix r (r=1 to n). In other words, the n identical processes progress in parallel in each of the transmitter and the receiver. The case of r=r will be explained hereafter.

The transmitter 1 and the receiver 2 mix the purification blocks Axr and Ayr, respectively, by using a Hamming distance amplification effect, such as a hash function, (i.e., according to a data mixing rule), and, after mixing them, convert them into mixed blocks Cxr and Cyr in steps 103 and 111, respectively. Each of the mixed blocks Cxr and Cyr has Q bits. The data processing means X 12 and the data processing means Y 22 (i.e., a data mixing means) carry out these conversion processes, respectively.

The Hamming distance between two digital data is the number of bit positions in which the two digital data disagree. The Hamming distance amplification effect is to use either a Hamming distance increase function F, as defined in (a), or an exclusive-OR entropy enhancement function, as defined in (b).

(a) Hamming distance increase function F: that provides a Hamming distance between F(s) and F(r), which is equal to or longer than d, F(s) and F(r) being respectively mappings of an arbitrary bit string s and each of all bit strings r having a Hamming distance equal to or shorter than a small number $\epsilon$ that exists for the arbitrary bit string s, where d>>1.

(b) Exclusive-OR entropy enhancement function: that increases the entropy of the logical exclusive-OR of two bit strings.

The reason why this processing is carried out will be explained hereafter. In other words, while the Hamming distance amplification effect on two identical data results in their mappings having the same value, the Hamming distance amplification effect on two data, which are different from each other at least one bit position thereof, results in their mappings having quite different values. That is, it can be thought that the Hamming distance of 1 bit or more between two different data is enlarged to the one that is about one-half of their data size. This is a feature of the present invention.

In this specification, the purification block Axr is a second purification block, the purification block Ayr is a first purification block, the disposable block Bxr is a second disposable block, the disposable block Byr is a first disposable block, the mixed block Cxr is a second mixed block, and the mixed block Cyr is a first mixed block.

Because the size of each of the mixed blocks Cxr and Cyr becomes 160 bits if "SHA-1" that is a well-known hash function is used as the Hamming distance amplification effect (i.e., the data mixing rule), Q=160. Therefore, each of the disposable blocks Bxr and Byr has to have 160 bits.

Next, as shown in FIG. 3, the transmitter 1 calculates a random number sequence as the disposable block Bxr having the same size as this mixed block Cxr, which has been mapped (or mixed), and implements an exclusive-OR (XOR) operation on the mixed block Cxr and the disposable block Bxr by using the data processing means X 12. The transmitter 1 then sends the calculation result, as the transmission block Dr, to the receiver 2 by way of the public network 4 by using the communication means X 11. In other words, the transmitter 1 sends the calculation result as Vernam-encrypted data. The transmission block Dr has a size of Q bits.

Vernam-encrypted data is encrypted data in which safety has been proven in terms of information theory when a bit string to be transmitted has the same length as a random number sequence that is the other one on which an XOR operation is implemented. At this time, the random number sequence can be used only once.

The transmission block Dr is an encrypted block.

When the receiver 2 receives the transmission block Dr by way of the communication means Y 21, the receiver 2 implements an XOR operation on the transmission block Dr and the disposable block Byr by using the data processing means Y 22 (i.e., a decrypted block generating means and an identity judgment means) first in step 112. The receiver then sets the calculation result to a made-for-verification block Er, and compares this made-for-verification block Er with the mixed block Cyr.

In other words,

Er=Dr XOR Byr (where XOR shows the exclusive-OR operation)

Because Dr=Cxr XOR Bxr,

Er=Dr XOR Byr

=(Cxr XOR Bxr) XOR Byr

Because Er=Cxr if Bxr and Byr are identical with each other, the comparison between the made-for-verification block Er and the mixed block Cyr is equivalent to the comparison between the mixed blocks Cxr and Cyr.

Actually, there is a possibility that the disposable blocks Bxr and Byr are not identical with each other in a strict sense, but have an error rate of about 1 percent, as previously mentioned.

The made-for-verification block Er is a decrypted block, and it is a decrypting rule to implement an XOR operation on the transmission block Dr and the disposable block Byr.

Because the size of each of the mixed blocks Cxr and Cyr becomes 160 bits if "SHA-1" that is a well-known hash function is used as the Hamming distance amplification effect, Q=160. Therefore, each of the disposable blocks Bxr and Byr has to have 160 bits.

Furthermore, if the purification blocks Axr and Ayr are quite the same data as each other, the mixed blocks Cxr and Cyr become quite the same data. If the purification blocks Axr and Ayr have even a single bit error, the mixed blocks Cxr and Cyr become quite different data under the influence of the Hamming distance amplification effect in steps 103 and 111.

Figure 5:
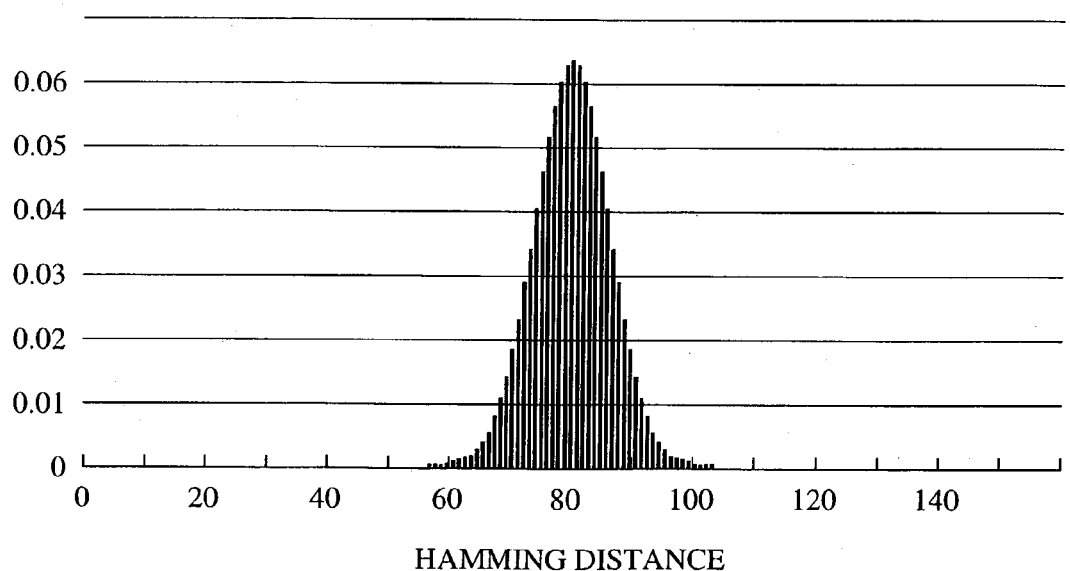
FIG. 5 is a diagram showing experimental results of the mixing performance of a hash function SHA-1.

FIG. 5 shows experimental results showing the performance of mixing data by the hash function "SHA-1".

The bit length of the input is fixed to 512 bits in this experiment. The figure shows what the Hamming distance between the outputs of two 512-bit data that are different from each other at only 1 bit position thereof is with a histogram of 10 million samples. The vertical axis shows frequencies normalized with the entire number of samples. Therefore, the probability of occurrence of the Hamming distance of 80 is 6% or more.

In this experiment, the mean value (m) is 79.999550 and the standard deviation ($\sigma$) is 6.327267. We further carried out experiments so as to also determine what the Hamming distance between the outputs of two 512-bit data that are different from each other at only two bit positions thereof is, and what the Hamming distance between the outputs of two 256-bit data that are different from each other at only one bit position thereof is. In those cases, the experiment results show a normal distribution having a means value of about 80 and a standard deviation of about 6.3. In other words, it has been proven that almost every pair of bit strings is converted into a pair of bit strings having no correlation to each other and a Hamming distance of about 80. Furthermore, as can be seen from the graph, the amount of variance is small and there is a peak at the Hamming distance of about 80 while the total number of bits is 160 bits. In general, users can set a security margin as a confidence interval. The width of the confidence interval can be set to 6·σ=38 that will be generally accepted by users. Actually, a minimum Hamming distance that appears in the case of the above-mentioned experiment using SHA-1 is 44, and the frequency of occurrence of the minimum Hamming distance is as very low as 1 or 2. Therefore, in the case of using SHA-1, 80−38=42 bits can be set to be a threshold used for judging whether or not two arbitrary bit strings are identical with each other.

In other words, when SHA-1 is chosen as a function having the Hamming distance amplification effect, it can be assumed that x_1=x_2 with a very high possibility if the Hamming distance between f(x_1) and f(x_2) is 42 or less for the two bit strings x_1 and x_2.

As can be seen from the above description, when the Hamming distance between the purification blocks Axr and Ayr is 1 or more and is sufficiently smaller than one-half of the number of bits included in each of the purification blocks Axr and Ayr (e.g., 1/100 or less), the hash function SHA-1 mixes the purification blocks Axr and Ayr so that the Hamming distance between the mixed blocks Cxr and Cyr becomes longer than that between the purification blocks Axr and Ayr.

Furthermore, assuming that the bit number of each of the purification blocks Axr and Ayr is LA, the Hamming distance between them is HA, the bit number of each of the mixed blocks Cxr and Cyr is LC, the Hamming distance between them is HC, a before-mixing Hamming distance ratio is HA/LA, and an after-mixing Hamming distance ratio is HC/LC, when the before-mixing Hamming distance ratio exceeds 0 and is sufficiently smaller than 0.5 (e.g., 0.01 or less), the after-mixing Hamming distance ratio becomes larger than the before-mixing Hamming distance ratio, and becomes 0.5□}0.25 when the confidence interval is assumed to be 6ƒÐ, for example. In this case, 38/160 is approximated at 0.25.

In addition, in this embodiment, in consideration of a rate (about 1%) of errors that occur between the disposable blocks Bxr and Byr, because 42−160·0.01=40.4 the mixed blocks Cxr and Cyr are the same as each other and therefore the purification blocks Axr and Ayr are identical with each other if the Hamming distance between the made-for-verification block Er and the mixed block Cyr is 40 or less in step 112, and the data processing means Y 22 then judges that "they are identical with each other". In other words, the data processing means Y 22 judges that "they are identical with each other" if the physical error rate is equal to or smaller than 25 percents.

Furthermore, because when the Hamming distance between the made-for-verification block Er and the mixed block Cyr exceeds 40 the mixed blocks Cxr and Cyr are different from each other and therefore the purification blocks Axr and Ayr are not identical with each other, the data processing means Y 22 judges that "they are different with each other".

Therefore, in this embodiment the "predetermined value" of the Hamming distance in step 112 of FIG. 3 is 40.

When the data processing means Y 22 judges that "they are identical with each other" in step 112, the receiver 2 notifies the transmitter 1 that they are identical with each other by way of the public network 4 by using the communication means Y 21 (in step 113). The receiver 2 further stores the purification block Ayr at a position of a purified-data storing area (not shown in the figure), which is specified by the value of the suffix r, within the data storage means Y 23 (in step 114), and finishes the process about this block (in step 115).

The transmitter 1 receives the judgment result sent thereto from the receiver 2 by way of the communication means X 11, and then checks the judgment result by using the data processing means X 12 (in step 105). When the judgment result indicates "They are identical with each other", the transmitter 1 finishes the process about that block (in step 106). As a result, the purification blocks Axr and Ayr that are identical with each other are stored in the data storage means X 13 and the storage means Y 23, respectively, and are completely shared between the transmitter 1 and the receiver 2.

"Completely shared" means that the transmitter 1 and the receiver 2 hold the same data.

The data processing means X 12 and the data processing means Y 22 store information indicating which purification blocks can be completely shared between the transmitter and the receiver, i.e., the value of the suffix r of the purification blocks Axr and Ayr that can be completely shared between the transmitter and the receiver in their respective "complete block number registers" (not shown in the figure) in the order that the complete sharing of the purification blocks Axr and Ayr are complete. Furthermore, each of the data processing means X 12 and the data processing means Y 22 counts the number of purification blocks that have been completely shared between the transmitter and the receiver, and, when the number of completely-shared purification blocks becomes n, determines that all the purification blocks are completely shared between the transmitter and the receiver and therefore the purification data Ax and Ay can be completely shared between the transmitter and the receiver.

When the data processing means Y 22 judges that "they are different from each other" in step 112, the receiver 2 notifies the transmitter 1 that they are different from each other by way of the communication means Y 21 and waits for an error correction code for the purification block Axr to be sent from the transmitter 1 (in step 116).

The transmitter 1 receives the judgment result sent thereto from the receiver 2 by way of the communication means X 11, and checks the judgment result by using the data processing means 12 (in step 105) and then, in step 107, generates an error correction code Arc for the purification block Axr (correction information) when the judgment result indicates that they are different from each other.

This error correction code Arc is information used to make the purification block Ayr agree with the purification block Axr.

A rough estimation of the length of a redundant code which makes it possible to carry out error correction using a Reed-Solomon code will be made hereafter. First, assume that a Reed-Solomon code on $GF(2^8)$ is used. In addition, assume that errors are not burst errors but random errors, and the average bit error rate is 1%. A coded word has 255 ($=2^8-1$) bytes·8=2040 bits on this descriptor, and 2040□·0.01≈21 error bits exist therein on average. Assuming that a single-bit error occurs per 1 symbol (=1 byte in this case), it is understood that there is an error in each of 21 bytes of 255 bytes. At this time, the number of check symbols that are defined for the Reed-Solomon code, i.e., the length of the redundant code becomes 42 bytes that is twice as large as 21 bytes. Therefore, in the case that the code length is 255 bytes, the information length is 213 bytes and the redundant length is 42 bytes, and therefore the ratio between them is about 1:0.2. When applying the error correction using a Reed-Solomon code to this embodiment, in accordance with the above-mentioned setting of the ratio, it is necessary to generate a redundant code having a length of about 20 percent of the target code to be corrected, and to send it as a Vernam-encrypted code after implementing an XOR operation on the redundant code and a random number sequence, depending on the size and bit error rate of the descriptor, of course.

While the transmitter 1 implements an exclusive-OR operation on the error correction code Arc and data (i.e., data for encryption) having the same length as the error correction code Arc, and transmits the exclusive-OR result, as Vernam-encrypted data, to the receiver 2, in step 107, the receiver 2 has to have the same data for encryption. Then, the data processing means X 12 reads the smallest one s of the numbers (i.e., the values of suffixes r) of other blocks that have already been completely shared from the above-mentioned "Completely-shared block number register", and reads the purification block Axs having the block number s from the data storage means X 13. The data processing means X 12 then implements an exclusive-OR operation on data including a number of leading bits of the purification block Axs, the number of leading bits being the same as the number of bits included in the error correction code Arc, and the error correction code Arc so as to generate Vernam-encrypted data, and transmits it, as an encryption error correction code, to the receiver 2 through the public network 4 by using the communication means X 11.

In addition, the data processing means X 12 stores the block number s in the "Completely-shared block number register" and increments the number of purification blocks that have been completely shared between the transmitter and the receiver.

The receiver 2, in step 117, receives this encryption error correction code by way of the communication means Y 21, and the data processing means Y 22 (error correcting means) reads the smallest one s of the numbers (i.e., the values of suffixes r) of other blocks that have already been completely shared from the above-mentioned "Completely-shared block number register", and reads the purification block Ays having the block number s from the data storage means Y 23. The data processing means Y 23 then implements an exclusive-OR operation on data (i.e., data for decryption) including a number of leading bits of the purification block Ays, the number of leading bits being the same as the number of bits included in the received encryption error correction code, and the received encryption error correction code so as to decrypt the Vernam-encrypted data, makes an error correction to the purification block Ayr using the decrypted error correction code Arc, and stores the error-corrected purification block Ayr in the data storage means Y 23.

In addition, the data processing means Y 23 stores the value of the suffix r (i.e., the block number s) in the "Completely-shared block number register" and increments the number of purification blocks that have been completely shared.

The above-mentioned data for encryption and the above-mentioned data for decryption are identical with each other.

As previously explained, in steps 107 and 117, the data processing means reads the smallest one s of the numbers of other blocks that have already been completely shared from the above-mentioned "Completely-shared block number register". At that time, when there is no purification block that has already been completely shared and therefore the "Completely-shared block number register" is empty, the data processing means interrupts the processing of step 107 until it completes the completely sharing of either of remaining purification blocks and stores the corresponding block number in the "Completely-shared block number register".

In the flow chart of FIG. 3, step 101 is a temporarily-shared data transmission step, step 102 is a second block generation step, step 103 is a second mixed block generation step, step 104 is an encrypted block generation step, step 105 is a second identity judgment step, step 106 is an ending step, step 107 is a correction information transmission step, step 110 is a first block generation step, step 111 is a first mixed block generation step, step 112 is an identity judgment step, steps 113 and 114 are a first purification block storage step, step 116 is a judgment result transmission step, and step 117 is an error correction step.

As mentioned above, in accordance with this embodiment, because the shared data purifying apparatus performs an error correction, it makes it possible for the transmitter and the receiver to completely share the same data without throwing away a lot of data compared with the prior art shared data purifying method. When the hash function SHA-1 is used as the Hamming distance amplification effect, for example, it is estimated that the hash function SHA-1 can generate a 160-bit hash value from data of $2^{64}-1$ bits or less. More concretely, it is assumed that the hash function SHA-1 generates a 160-bit hash value from data of 10,000 bits. Furthermore, assume that the error rate is as extremely small as about 0.01% (although this error rate cannot be provided in present quantum cryptography experiments, a following explanation will be made based on this assumption). Data of 10,000 bits can have about one error. Because the hash value has 160 bits, disposable data that is used as Vernam-encrypted data will have 160 bits. Therefore, if no error is included in the data of 10,000 bits, because 160 bits are thrown away and 9,840 bits are shared between the transmitter and the receiver, data having about 98% or more of the length of the original data can be picked up as shared data. In contrast, when the data includes errors, an error correction code is generated for the data of 10,000 bits. Assuming that these errors can be corrected with a redundant code having about 30% of the length of the original data, it is necessary to send data of 3,000 bits as Vernam-encrypted data to the receiver. Therefore, the disposable data finally has 160+3,000=3,160 bits in all, and, as a result, about 70% of the original data can be saved because 6,840 bits of the original data can be shared between the transmitter and the receiver.

Furthermore, in accordance with this embodiment, each of the transmitter and the receiver (i.e., the shared data purifying apparatus) divides temporarily-shared data into a plurality of purification blocks and a plurality of disposable blocks, and enlarges the Hamming distance between corresponding purification blocks being held by the transmitter and the receiver by using a Hamming distance amplification effect. As a result, the present embodiment offers an advantage of easily judging whether the temporarily-shared data stored in the transmitter is identical with or different from that stored in the receiver.

Particularly, when each block that is temporarily shared between the transmitter and the receiver has a Hamming distance sufficiently smaller than 50% of its data size, because the Hamming distance is enlarged after the block is mixed, the shared data purifying apparatus judges whether the temporarily-shared data stored in the transmitter is identical with or different from that stored in the receiver more effectively.

Furthermore, in accordance with this embodiment, the transmitter and the receiver carry out error corrections when the temporarily-shared data stored in the transmitter is identical with or different from that stored in the receiver. As a result, the present embodiment offers an advantage of making it possible for the transmitter and the receiver to share many pieces of identical data with each other.

In addition, in accordance with this embodiment, the transmitter Vernam-encrypts each purification block with disposable data and transmits it to the receiver after mixing each purification block by using the Hamming distance amplification effect. As a result, the present embodiment offers another advantage of reducing the risk of data being tapped.

Furthermore, in accordance with this embodiment, each of the transmitter and the receiver divides the temporarily-shared data into a plurality of blocks (a pair of a plurality of purification blocks and a plurality of disposable blocks). As a result, the present embodiment offers another advantage of making it possible for the transmitter to transmit an error correction code (i.e., correction information) to the receiver by using data on other blocks that have been completely shared successfully, thereby improving the safety of hiding of data.

In addition, in accordance with this embodiment, in each of the transmitter and the receiver there is provided a completely-shared block number register in which the numbers of blocks that have been completely shared successfully are stored. As a result, the present embodiment offers another advantage of speeding up the process of Vernam-encrypting and transmitting error correction codes.

Furthermore, in accordance with this embodiment, the shared data purifying apparatus determines whether the first purification block and the second purification block are identical with or different from each other by using the Hamming distance between the decrypted block and the first mixed block. As a result, the present embodiment offers another advantage of being able to flexibly change the judgment reliability by changing a reference value (i.e., a predetermined value) for use in the judgment of whether or not the Hamming distance exceeds the predetermined value.

In accordance with this embodiment, instead of the above-mentioned hash function SHA-1, another hash function can be used as the Hamming distance amplification effect.

Although it is assumed that the "predetermined value" in step 112 of FIG. 3 to be 40, the predetermined value can be 42 because the sufficient reliability can be provided even though the predetermined value is 42 (i.e., the confidence interval of 6σ) as previously explained as to the experimental results.

In addition, in the case of using another hash function other than the hash function SHA-1, the predetermined threshold can be another value according to the number of output bits and data mixing characteristics.

Furthermore, the Hamming distance amplification effect only has to be a means of mixing data and is not limited to a hash function. For example, an encryption function for use with common key encryptions, such as DES and MISTY, and public key encryptions, such as RSA, can be used as the Hamming distance amplification effect.

In addition, in accordance with this embodiment, the shared data purifying apparatus carries out quantum cryptography communications so that the transmitter 1 and the receiver 2 can share data with each other, as previously mentioned. The shared data purifying apparatus can carry out communications via a public line instead of quantum cryptography communications, and can alternatively use communications other than cryptography communications. In other words, the transmitter 1 only has to transmit data to the receiver 2 in order to share the data with the receiver 2 in step 101. Neither the format of data to be transmitted nor the transmission method of transmitting the data to the receiver are limited to the ones mentioned above.

Furthermore, in accordance with this embodiment, P and Q can be so determined that n=1.

In this case, the first purification data and the first purification block are identical with each other, the first disposable data and the first disposable block are identical with each other, the second purification data and the second purification block are identical with each other, and the second disposable data and the second disposable block are identical with each other.

In addition, in accordance with this embodiment, in steps 107 and 117 of the flow chart of FIG. 3, the transmitter and the receiver use parts of the purification blocks as data for encryption and data for decryption, respectively, as previously explained. As an alternative, in step 112, the shared data purifying apparatus can assume that the disposable blocks Bxr and Byr are completely shared between the transmitter and the receiver when the Hamming distance between the corresponding purification blocks is 0, and can use parts of the disposable blocks Bxr and Byr as data for encryption and data for decryption, respectively.

Furthermore, in accordance with this embodiment, in steps 103 and later of the transmitter 1 processes are carried out in parallel with one another for all suffixes r (r=1 to n), and in steps 111 and later of the receiver 2 processes are also carried out in parallel with one another for all suffixes r (r=1 to n), as previously mentioned. As an alternative, those processes can be carried out sequentially in the order of the block numbers r, starting from r=1, in each of the transmitter 1 and the receiver 2. In this case, when it is determined that in step 112 "they are different from each other" for a certain block number u, and there is no other purification block that has been completely shared and the "Completely-shared block number register" is empty, the process about the block number u is interrupted and the process about the next block number will be started. Then, when the completely sharing of another purification block specified by another block number v is completed and the number v of the other purification block is stored in "Completely-shared block number register", the process about the block number u is restarted and the error correction code is Vernam-encrypted by using the purification block specified by the block number v and is then decrypted.

Embodiment 2

As previously mentioned, in the shared data purifying system in accordance with embodiment 1, the transmitter 1 generates and transmits an error correction code for each purification block to the receiver 2 only when the receiver 2 compares a made-for-verification block Er with a mixed block Cyr and then judges that "they are different from each other".

In contrast, in a shared data purifying system in accordance with embodiment 2, a transmitter 1 generates and transmits an error correction code for every purification block to a receiver 2.

The shared data purifying system in accordance with this embodiment has the same structure as that of FIG. 1 as explained in Embodiment 1. Furthermore, each of the transmitter and receiver of the shared data purifying system divides temporarily-shared data into purification data and disposable data, as shown in FIGS. 4A and 4B, like that of embodiment 1.

Figure 6:
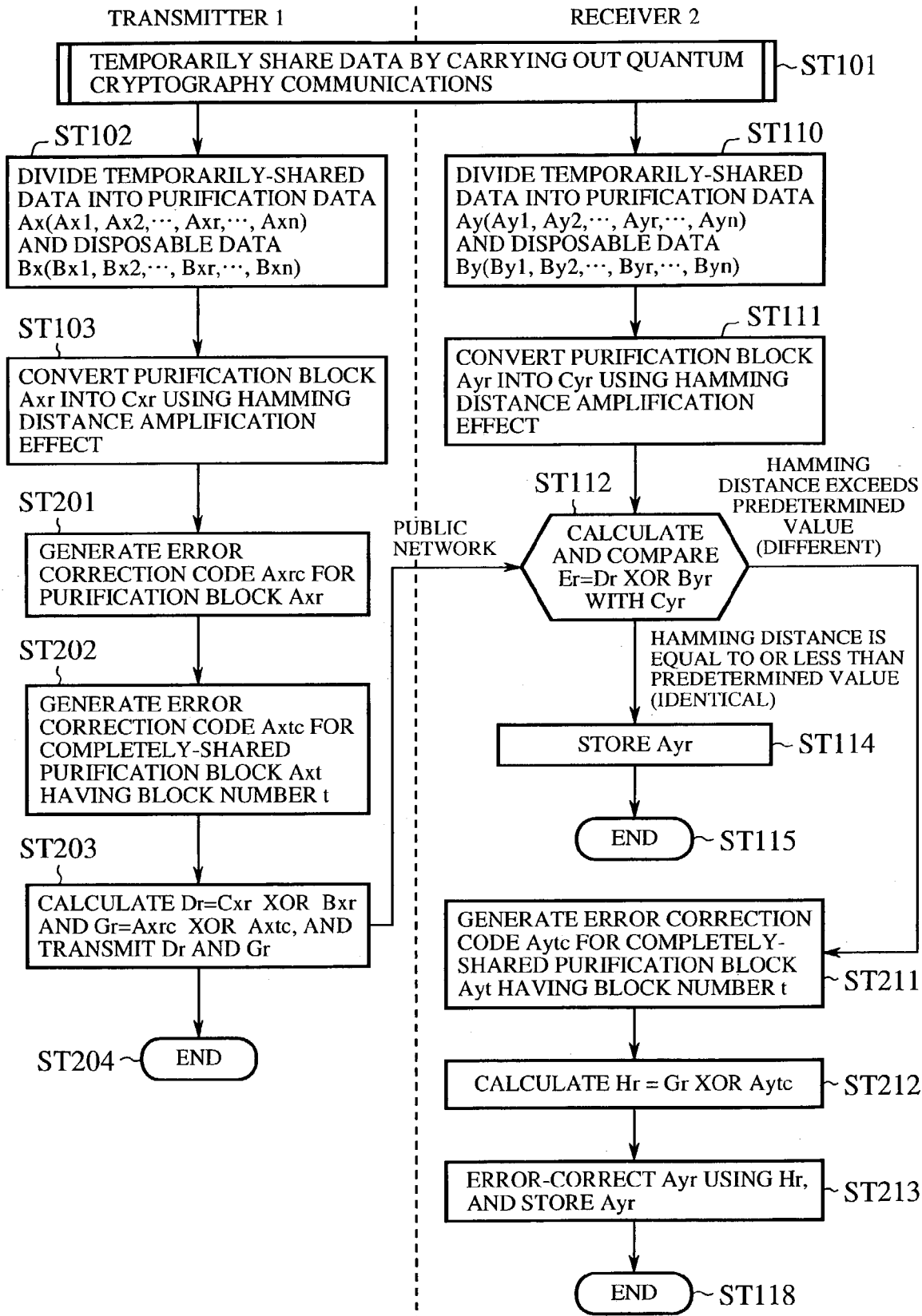
FIG. 6 is a flow chart showing an operation of a shared data purifying system in accordance with embodiment 2 of the present invention.

FIG. 6 is a flow chart showing an operation of the shared data purifying system in accordance with this embodiment.

In the flow chart of FIG. 6, in steps designated by the same reference numerals as shown in FIG. 3 the shared data purifying system carries out the same processes as those done by that of embodiment 1, and therefore the explanation of those processes will be omitted hereafter.

Even in this embodiment, in steps 103 and later of the transmitter 1 of FIG. 6 processes are carried out in parallel with one another for all suffixes r (r=1 to n), and in steps 111 and later of the receiver 2 processes are also carried out in parallel with one another for all suffixes r (r=1 to n). In other words, the n identical processes progress in parallel in each of the transmitter 1 and the receiver 2. The case of r=r will be explained hereafter.

A data processing means X 12 of the transmitter 1 generates an error correction code Axrc for the purification block Axr in step 201.

The data processing means X 12 then, in step 202, reads the smallest one t of the numbers (i.e., the values of suffixes r) of other blocks that have already been completely shared from a "Completely-shared block number register", and reads the purification block Axt having the block number t from a data storage means X 13. Then, in step 203 of generating an error correction code Axtc for the purification block Axt, the data processing means X 12 implements an exclusive-OR (XOR) operation on a mixed block Cxr and a disposable block Bxr, and defines the XOR operation result as a transmission block Dr, like that of embodiment 1. In addition, the data processing means X 12 implements an exclusive-OR operation on the above-mentioned error correction codes Axrc and Axtc, defines the operation result as a correction code Gr for transmission, and transmits it to the receiver 2 through a public network by using a transmission means X 11.

The data processing means X 12 further stores the block number specifying the purification block Axt in the "Completely-shared block number register", and increments the number of purification blocks that have already been completely shared.

When the receiver 2 receives the above-mentioned transmission block Dr and the above-mentioned correction code Gr for transmission by way of a communication means Y 21, the receiver 2 implements an XOR operation on the transmission block Dr and a disposable block Byr by using a data processing means Y 22 (i.e., a decrypted block generating means and an identity judgment means) in step 112, defines the XOR operation result as a made-for-verification block Er, and compares this made-for-verification block Er with a mixed block Cyr.

Like that of embodiment 1, when the Hamming distance between the made-for-verification block Er and the mixed block Cyr is equal to or less than a predetermined value (e.g., 40), the data processing means Y 22, in step 112, judges that "they are identical with each other" because the mixed blocks Cxr and Cyr are identical with each other and therefore the purification blocks Axr and Ayr are identical with each other.

In contrast, when the Hamming distance between the made-for-verification block Er and the mixed block Cyr is greater than the predetermined value (e.g., 40), the data processing means Y 22 judges that "they are different from each other" because the mixed blocks Cxr and Cyr are different from each other and therefore the purification blocks Axr and Ayr are not identical with each other.

When the data processing means Y 22, in step 112, judges that "they are identical with each other", the receiver 2 stores the purification block Ayr at a position of a purified-data storing area (not shown in the figure), which is specified by the value of the suffix r, within a data storage means Y 23 (in step 114), and finishes the process about this block (in step 115). As a result, the purification blocks Axr and Ayr that are identical with each other are stored in the data storage means X 13 and the storage means Y 23, respectively, and are completely shared between the transmitter 1 and the receiver 2.

The data processing means Y 22 stores the block number in a "Completely-shared block number register" and increments the number of purification blocks that have been completely shared.

The data processing means Y 22 (i.e., an error correcting means) of the receiver 2 reads the smallest one t of the numbers (i.e., the values of suffixes r) of other blocks that have already been completely shared from the "Completely-shared block number register", and reads the purification block Ayt having the block number t from the data storage means Y 23. The data processing means Y 22 then generates an error correction code Aytc for this purification block Ayt (in step 211).

The data processing means Y 22 (i.e., the error correcting means) further implements an exclusive-OR Hr operation on the above-mentioned correction code Gr for transmission and the above-mentioned error correction code Aytc (in step 212) as follows.

Hr=Gr XOR Aytc (where XOR represents an exclusive-OR operation)

Because Gr=Axrc XOR Axtc,

Hr=Gr XOR Aytc

=(Axrc XOR Axtc) XOR Aytc.

Axtc and Aytc are identical with each other because they are generated from the purification blocks Axt and Ayt specified by the block number t, which have already been completely shared, in steps 202 and 211, respectively.

Therefore, Hr=Axrc, where Hr is the error correction code for the purification block Axrc.

The data processing means Y 22 makes a correction to the purification data Ayr having errors by using Hr, and stores the corrected purification data Ayr in the data storage means Y 23 (in step 213). The data processing means Y 22 stores the block number in the "Completely-shared block number register" and increments the number of purification blocks that have been completely shared, and, after that, finishes the process about this block number (in step 214).

In the flowchart of FIG. 6, step 201 is a second correction information generation step, step 202 is a second shared correction information generation step, step 203 is a correction information encryption step and a correction information transmission step, step 211 is a first shared correction information generation step, step 212 is a correction information decrypting step, and step 213 is an error correction step.

As mentioned above, in accordance with this embodiment, the transmitter 1 transmits a correction code Gr for transmission as well as a transmission block Dr to the receiver 2. As a result, the present embodiment offers an advantage of eliminating the necessity for the receiver 2 to respond to any data transmission from the transmitter 1, and therefore reducing the volume of traffic between them because transmission of data between them is carried out with one-way traffic from the transmitter to the receiver.

Embodiment 3

As previously mentioned, in the shared data purifying system in accordance with embodiment 1, the transmitter 1 generates and transmits an error correction code for each purification block to the receiver 2 when the receiver 2 compares a made-for-verification block Er with a mixed block Cyr and then judges that "they are different from each other".

In a shared data purifying system in accordance with this embodiment 3, when a receiver 2 judges that "they are different from each other", a transmitter 1 converts each purification block Axr into Vernam-encrypted data and transmits it to the receiver 2, and the receiver also converts each purification block Ayr into Vernam-encrypted data so as to estimate bit positions where errors occur.

The shared data purifying system in accordance with this embodiment has the same structure as that of FIG. 1 as explained in Embodiment 1. Furthermore, each of the transmitter and receiver of the shared data purifying system divides temporarily-shared data into purification data and disposable data, as shown in FIGS. 4A and 4B, like that of embodiment 1.

Figure 7:
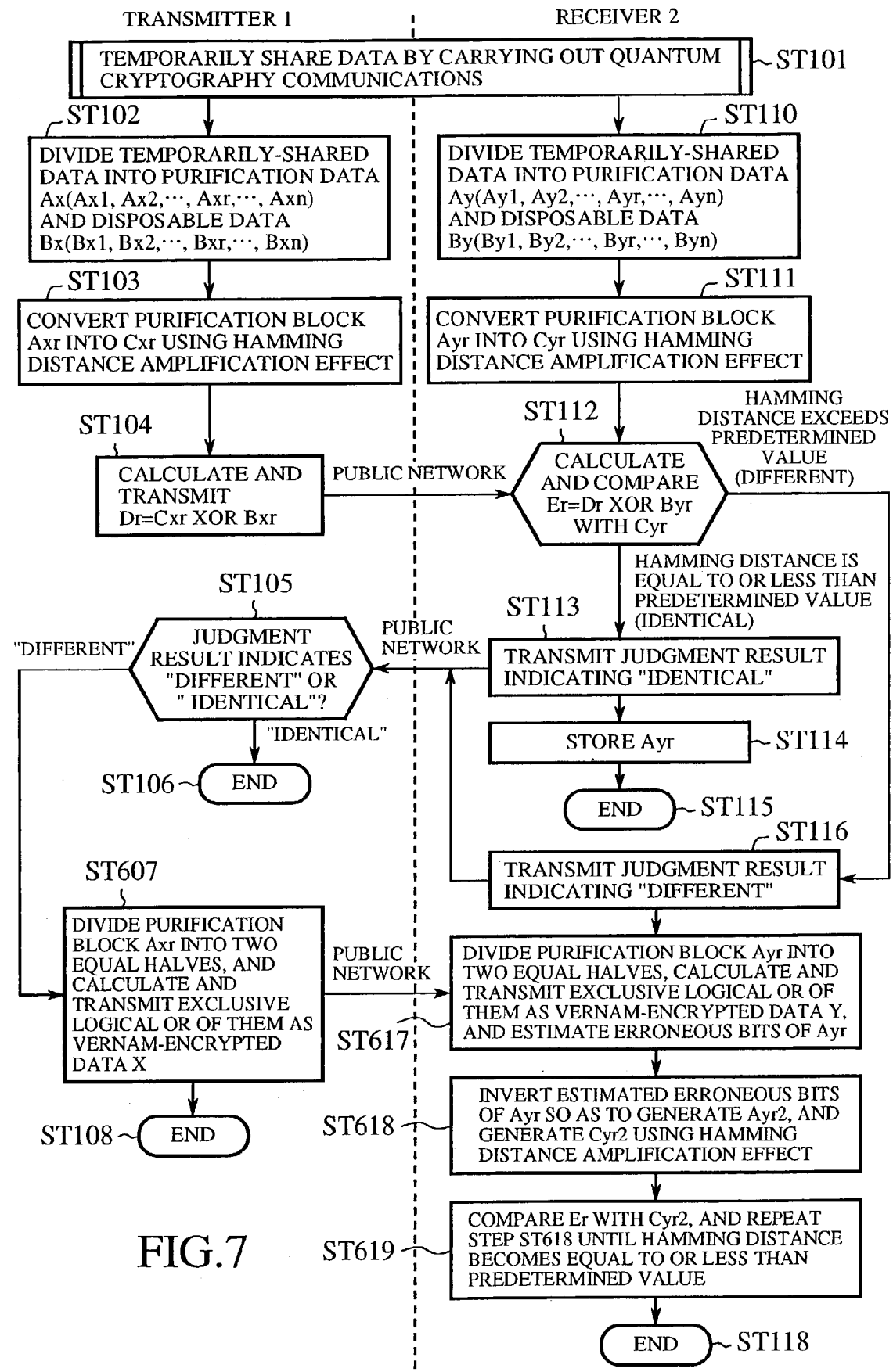
FIG. 7 is a flow chart showing an operation of a shared data purifying system in accordance with embodiment 3 of the present invention.

FIG. 7 is a flow chart showing an operation of the shared data purifying system in accordance with this embodiment. In the flow chart of FIG. 7, in steps designated by the same reference numerals as shown in FIG. 3 the shared data purifying system carries out the same processes as those done by that of embodiment 1, and therefore the explanation of those processes will be omitted hereafter.

Even in this embodiment, in steps 103 and later of the transmitter 1 of FIG. 7 processes are carried out in parallel with one another for all suffixes r (r=1 to n), and in steps 111 and later of the receiver 2 processes are also carried out in parallel with one another for all suffixes r (r=1 to n) In other words, the n identical processes progress in parallel in each of the transmitter 1 and the receiver 2. The case of r=r will be explained hereafter.

The transmitter 1 receives a judgment result sent thereto from the receiver 2 by way of a communication means X 11, and then checks the judgment result by using a data processing means X 12 (in step 105). When the judgment result indicates "they are different from each other", the data processing means X 12, in step 607 as shown in FIG. 8A, divides the purification block Axr into first and second equal halves, and implements an exclusive-OR operation on all bits of the first half of Axr and corresponding bits of the second half so as to generate Vernam-encrypted data X. The transmitter 1 then transmits this Vernam-encrypted data X to the receiver 2 by way of the communication means X 11.

The receiver 2 receives this Vernam-encrypted data X by way of a communication means Y 21, and a data processing means Y 22, divides the purification block Ayr into first and second equal halves, as shown in FIG. 8B, and implements an exclusive-OR operation on all bits of the first half of Ayr and corresponding bits of the second half so as to generate Vernam-encrypted data Y. Although this Vernam-encrypted data Y is not transmitted to outside the receiver 2, the data is called "encrypted data" for convenience' sake.

Although the Vernam-encrypted data X and the Vernam-encrypted Y must be identical with each other if the purification blocks Axr and Ayr are identical with each other, in this case the Vernam-encrypted data X and the Vernam-encrypted Y are not identical with each other because the judgment results of steps 105 and 112 indicate that "they are different from each other". The data processing means of the receiver can estimate which bit positions of the purification block Ayr differ from the corresponding bits of the purification block Axr from the bit positions which the digits differ between the Vernam-encrypted X and the Vernam-encrypted Y.

Figures 9, 13:
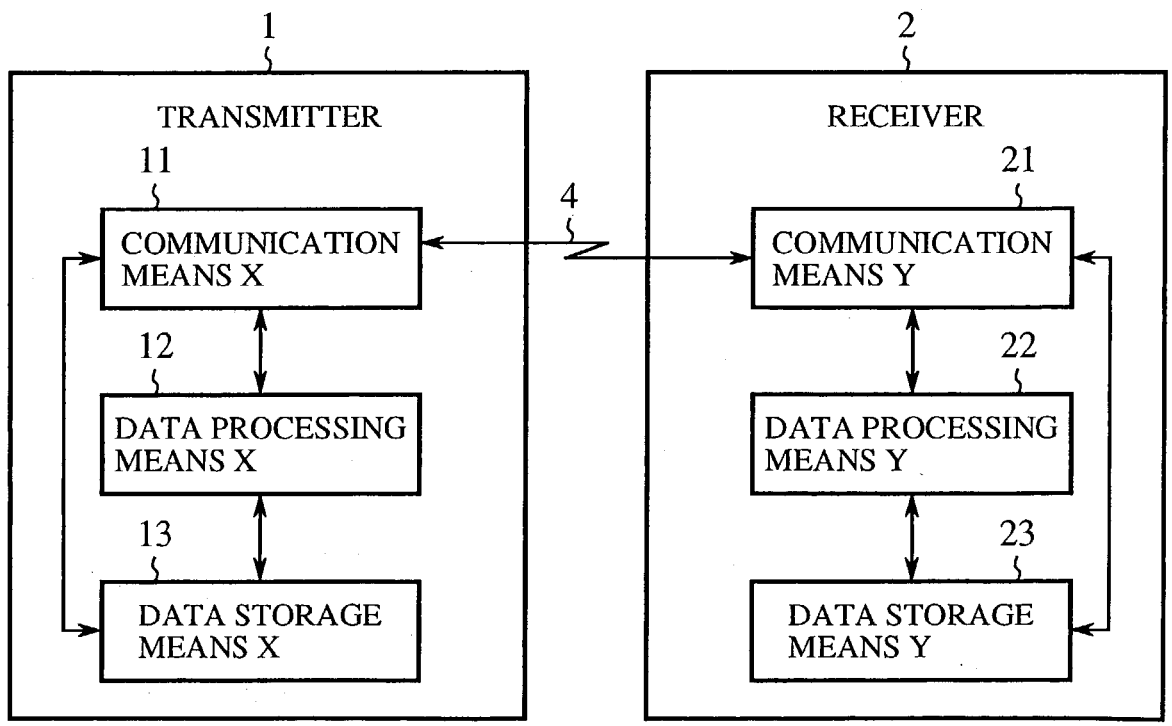
FIG. 9 is a diagram for explaining an estimation of erroneous positions in accordance with embodiment 3 of the present invention.
FIG. 13 is a diagram showing a shared data purifying system in accordance with embodiment 6 of the present invention.

To this end, the data processing means implements an exclusive-OR operation on the Vernam-encrypted X and the Vernam-encrypted Y, as shown in FIG. 9, so as to generate verification data. For example, when "1" appears at the b1-th bit of this verification data, the data processing means can estimate that either the b1-th bit of the first half of the purification block Ayr or the b1-th bit of the second half of the purification block Ayr is erroneously an inversion of the same bit of the purification block Axr. When "1" also appears at the b2-th bit of the verification data, the data processing means can similarly estimate that either the b2-th bit of the first half of the purification block Ayr or the b2-th bit of the second half of the purification block Ayr is erroneously an inversion of the same bit of the purification block Axr. The receiver 2 carries out the above-mentioned process of generating the Vernam-encrypted Y and the above-mentioned process of estimating erroneous bit positions of the purification block Ayr in step 617.

The receiver 2 then inverts either one of the bit positions of the purification block Ayr which have been estimated to have errors by using the data processing means Y 22 (i.e., an error correcting means) so as to generate a temporary purification block Ayr2, and then mixes this temporary purification block Ayr2 through the same Hamming distance amplification effect as that used in step 111 so as to generate a temporary mixed block Cyr2 (in step 618).

The data processing means Y 22 compares this temporary mixed block Cyr2 with a made-for-verification block Er determined in step 112, and checks to see whether the Hamming distance between them is equal to or less than a predetermined value (e.g., 40 in this embodiment). Because the data processing means Y 22 can assume that the temporary purification block Ayr2 is identical with the purification data Axr when the Hamming distance is equal to or less than the predetermined value, the data processing means Y 22 stores this temporary purification block Ayr2 in a position of a purified data storing area of a data storage means Y 23, which is specified by the value of the suffix r.

When the Hamming distance between the temporary mixed block Cyr2 and the made-for-verification block Er is greater than the predetermined value, the data processing means Y 22 inverts all bits included in one of varying combinations of all bits of the purification block Ayr that have been estimated to have errors, e.g., inverts some other bits of the purification block Ayr that have been estimated to have errors so as to generate a temporary purification block Ayr2, or simultaneously inverts all bits of the purification block Ayr that have been estimated to have errors, and repeats the inversion process until the Hamming distance between the temporary mixed block Cyr and the made-for-verification block Er becomes equal to or shorter than the predetermined value. When the Hamming distance between the temporary mixed block Cyr and the made-for-verification block Er becomes equal to or shorter than the predetermined value, the data processing means Y 22 stores the temporary purification block Ayr2 in a position of the purified data storing area of the data storage means Y 23, which is specified by the value of the suffix r (in step 619), and then finishes the processing about this block number (in step 118).

In the flow chart of FIG. 7, step 607 is a correction information transmission step, and steps 617 to 619 are an error correction step.

As mentioned above, in accordance with this embodiment, even if errors occur, the receiver can estimate and correct positions where the errors occur only from purification blocks that have already been transmitted thereto. As a result, the present embodiment offers an advantage of being able to effectively use transmitted data.

The transmitter and the receiver need not calculate error correction codes, and, therefore, need not send and receive these error correction codes. As a result, the present embodiment offers another advantage of simplifying processing for error corrections.

Embodiment 4

As previously mentioned, in the shared data purifying system in accordance with embodiment 3, the transmitter 1 converts each purification block Axr into a Vernam-encrypted block and transmits it to the receiver 2 when the receiver 2 compares a made-for-verification block Er with a mixed block Cyr and then judges that "they are different from each other".

In a shared data purifying system in accordance with this embodiment 4, a transmitter 1 converts each of all purification blocks into a Vernam-encrypted block and transmits it to a receiver 2.

The shared data purifying system in accordance with this embodiment has the same structure as that of FIG. 1 as explained in Embodiment 1. Furthermore, each of the transmitter and receiver of the shared data purifying system divides temporarily-shared data into purification data and disposable data, as shown in FIGS. 4A and 4B, like that of embodiment 1.

Figure 10:
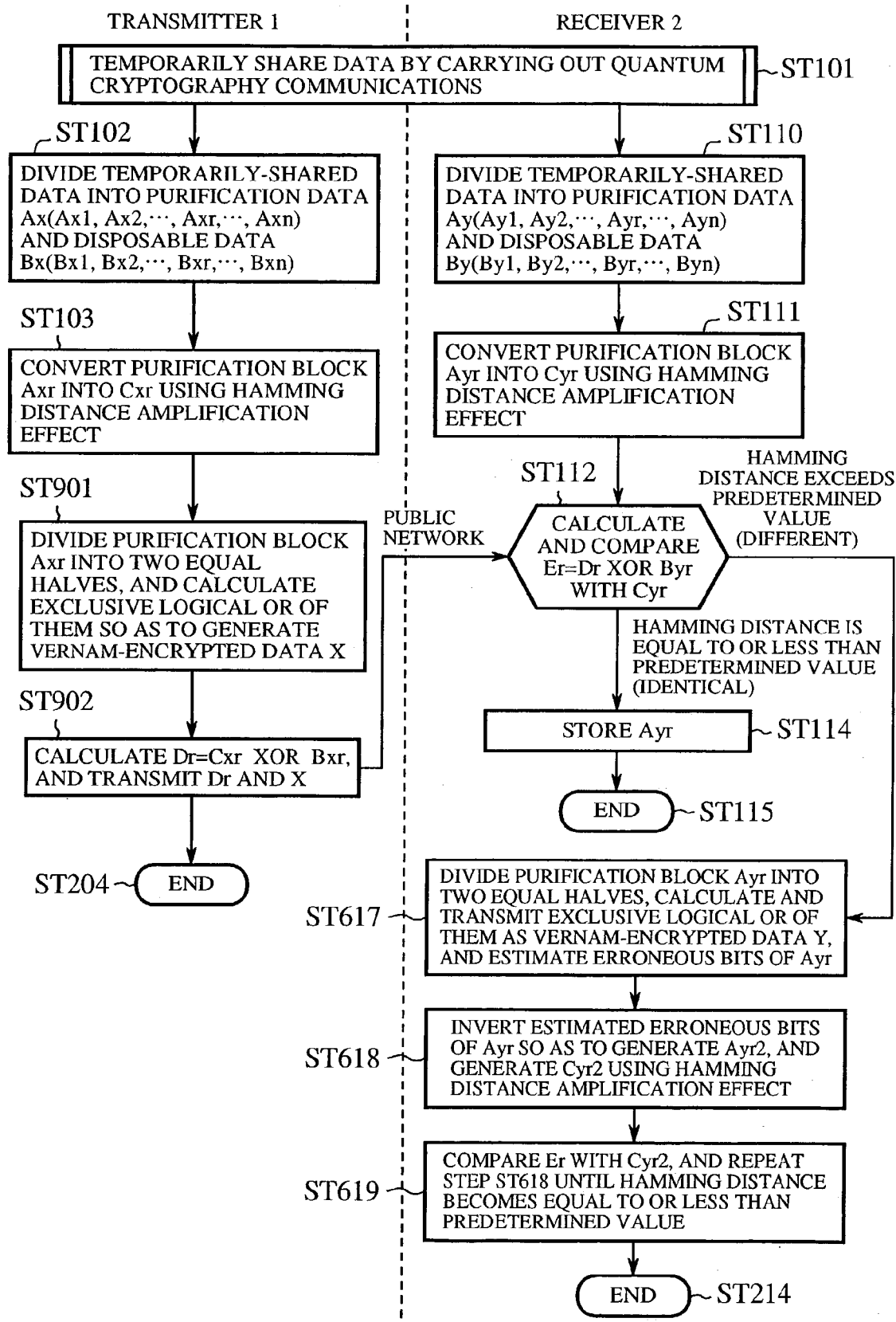
FIG. 10 is a flow chart showing an operation of a shared data purifying system in accordance with embodiment 4 of the present invention.

FIG. 10 is a flow chart showing an operation of the shared data purifying system in accordance with this embodiment.

In the flow chart of FIG. 10, in steps designated by the same reference numerals as shown in FIGS. 3 and 7 the shared data purifying system carries out the same processes as those done by those of embodiments 1 and 3, and therefore the explanation of those processes will be omitted hereafter.

Even in this embodiment, in steps 103 and later of the transmitter 1 of FIG. 10 processes are carried out in parallel with one another for all suffixes r (r=1 to n), and in steps 111 and later of the receiver 2 processes are also carried out in parallel with one another for all suffixes r (r=1 to n) In other words, the n identical processes progress in parallel in each of the transmitter 1 and the receiver 2. The case of r=r will be explained hereafter.

The transmitter 1, in step 901, divides each purification block Axr into first and second equal halves, as shown in FIG. 8A, and implements an exclusive-OR operation on all bits of the first half of Axr and corresponding bits of the second half of Axr so as to generate Vernam-encrypted data X.

Next, as in the case of step 104 of FIG. 3 explained in Embodiment 1, the transmitter 1, in step 902, calculates a random number sequence as a disposable block Bxr having the same size as a mixed block Cxr, and implements an exclusive-OR (XOR) operation on the mixed block Cxr and the disposable block Bxr by using a data processing means. The transmitter 1 then sends the calculation result, as a transmission block Dr, to the receiver 2 by way of a public network 4 by using a communication means X 11.

As mentioned above, in accordance with this embodiment, the transmitter 1 can transmit the Vernam-encrypted X as well as the transmission block Dr to the receiver. As a result, the present embodiment offers an advantage of eliminating the necessity for the receiver 2 to respond to any data transmission from the transmitter 1, and therefore reducing the volume of traffic between them because transmission of data between them is carried out with one-way traffic from the transmitter to the receiver.

As mentioned above, in accordance with this embodiment, even if errors occur, the receiver can estimate and correct positions where the errors occur only from purification blocks that have already been transmitted thereto. As a result, the present embodiment offers an advantage of being able to effectively use transmitted data.

The transmitter and the receiver need not calculate error correction codes, and, therefore, need not send and receive these error correction codes. As a result, the present embodiment offers another advantage of simplifying processing for error corrections.

Embodiment 5

As previously mentioned, in the shared data purifying system in accordance with embodiment 1, the transmitter 1 converts the mixed block Cxr into a transmission block Dr and then transmits it to the receiver 2. In contrast, in a shared data purifying system in accordance with this embodiment, a transmitter 1 transmits a mixed block Cxr to a receiver 2.

The shared data purifying system in accordance with this embodiment has the same structure as that of FIG. 1 as explained in Embodiment 1.

Figure 11:
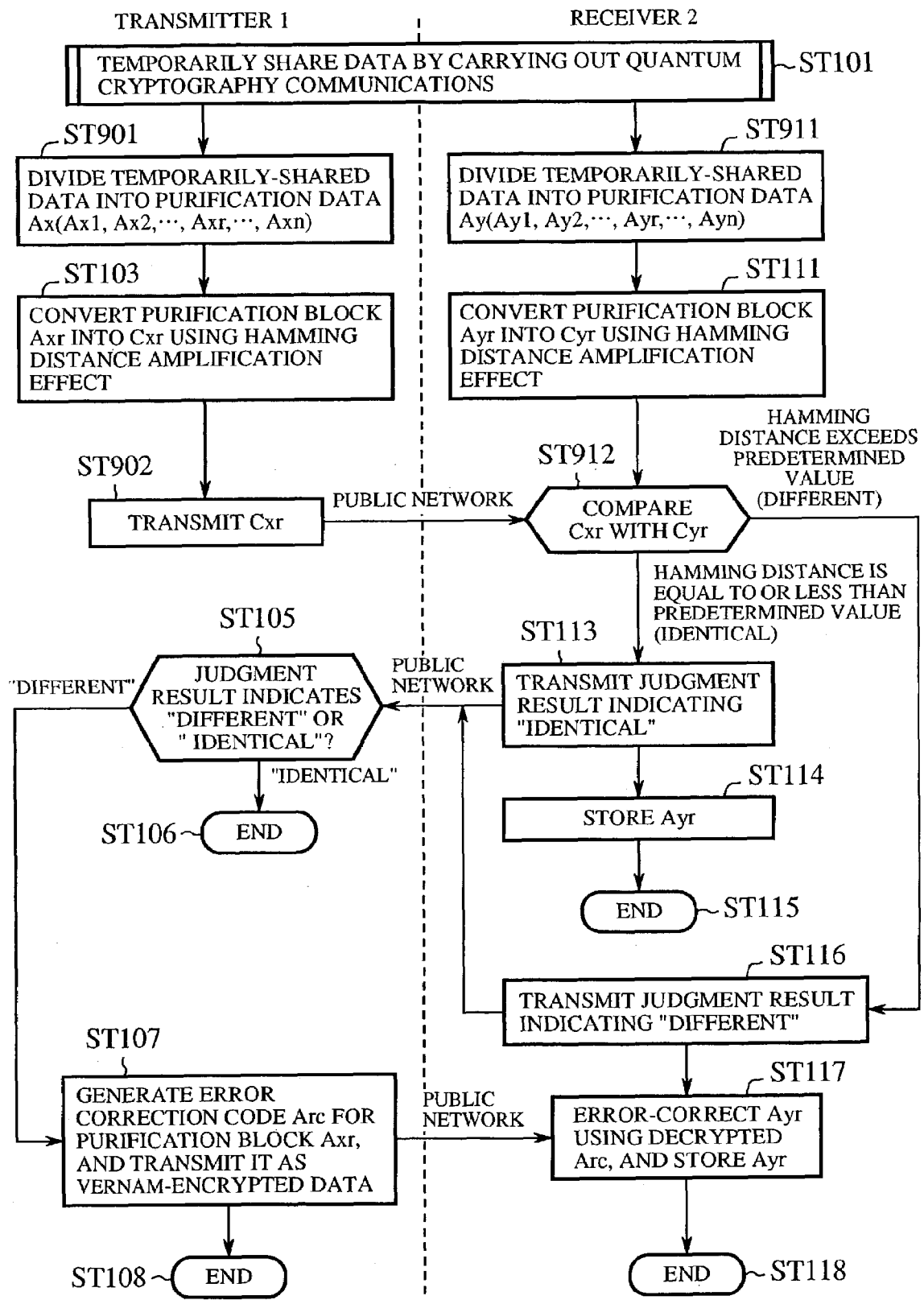
FIG. 11 is a flow chart showing an operation of a shared data purifying system in accordance with embodiment 5 of the present invention.

FIG. 11 is a flow chart showing an operation of the shared data purifying system in accordance with this embodiment.

Figure 12A:
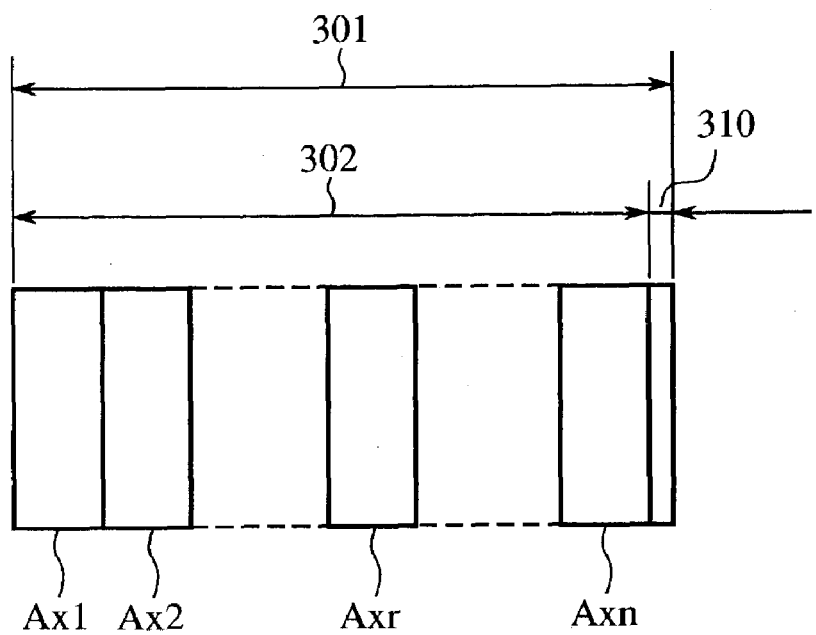
FIG. 12A is a diagram showing division of temporarily-shared data X into purification data and disposable data in accordance with embodiment 5 of the present invention.
Figure 12B:
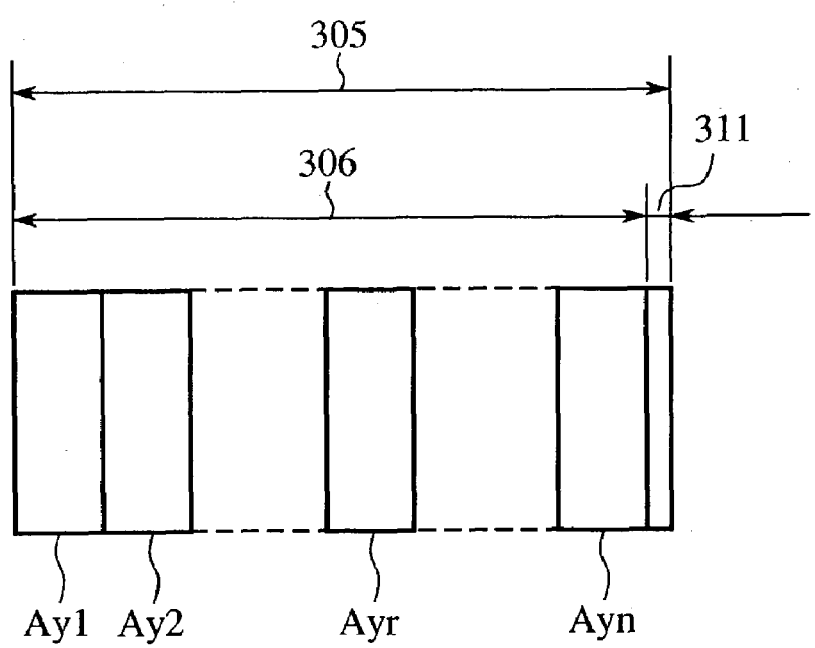
FIG. 12B is a diagram showing division of temporarily-shared data Y into purification data and disposable data in accordance with embodiment 5 of the present invention.

FIGS. 12A and 12B are diagrams showing divisions of temporarily-shared data X and Y into purification data in accordance with this embodiment. In the figure, reference numerals 310 and 311 denote remainders each having a size of β bits. Furthermore, the same elements as shown in FIGS. 4A and 4B are designated by the same reference numerals, and therefore the explanation of those elements will be omitted hereafter.

In the flow chart of FIG. 11, in steps designated by the same reference numerals as shown in FIG. 3 the shared data purifying system carries out the same processes as those done by those of embodiment 1, and therefore the explanation of those processes will be omitted hereafter.

Even in this embodiment, in steps 103 and later of the transmitter 1 of FIG. 11 processes are carried out in parallel with one another for all suffixes r (r=1 to n), and in steps 111 and later of the receiver 2 processes are also carried out in parallel with one another for all suffixes r (r=1 to n). In other words, the n identical processes progress in parallel in each of the transmitter 1 and the receiver 2. The case of r=r will be explained hereafter.

The transmitter 1 and the receiver 2, in steps 901 and 911, divide temporarily-shared data X and temporarily-shared data Y, which are temporarily shared in step 101, into n purification blocks Axr (r=1 to n) and n purification blocks Ayr (r=1 to n), these purification blocks Axr and Ayr having equal numbers P of bits, as shown in FIGS. 12A and 12B, respectively.

The plurality of purification blocks Axr are stored in a RAM within a data processing means X 12, and the plurality of purification blocks Ayr are stored in a RAM within a data processing means Y 22. As an alternative, the plurality of purification blocks Axr can be stored in a data storage means X 13, and the plurality of purification blocks Ayr can be stored in a data storage means Y 23.

Assuming that the temporarily-shared data X has the same bit number, i.e. L bits, as the temporarily-shared data Y, as can be seen from FIGS. 12A and 12B, n is obtained from the following equation.

$$L = P \cdot n + \beta \, (\beta < P)$$

In this case, the remainder of β bits is not used.

The rate of errors that occur between the purification blocks Axr and Ayr at the same suffix r depends on the quality of a quantum communication line 3 and can be assumed to be about 1 percent.

Steps 103 and later of the transmitter 1 are carried out in parallel with one another for each suffix r (r=1 to n), and steps 911 and later of the receiver 2 are also carried out in parallel with one another for each suffix r (r=1 to n) In other words, the n identical processes progress in parallel.

The transmitter 1, in step 902, transmits the above-mentioned mixed block Cxr to the receiver 2 through a public network 4 by using a communication means X 11.

When the receiver 2 receives the above-mentioned mixed block Cxr by way of a communication means Y 21, the receiver 2 compares this mixed block Cxr with a mixed block Cyr by using the data processing means Y 22, in step 912.

The processing is thus carried out hereafter, as in the case of embodiment 1, and the purification blocks Axr and Ayr are completely shared between the transmitter 1 and the receiver 2.

In accordance with this embodiment, the transmitter 1 transmits the mixed data Cxr to the receiver 2 without Vernam-encrypting it and the receiver 2 compares it with mixed data Cyr without carrying out any process on the received mixed data Cxr. As a result, the present embodiment offers an advantage of simplifying the processing.

Embodiment 6

As previously mentioned, in the shared data purifying system in accordance with embodiment 1, the transmitter 1 transmits temporarily-shared data to the receiver 2. In contrast, in a shared data purifying system in accordance with embodiment 6, a transmitter 1 and a receiver 2 independently acquire temporarily-shared data, and the receiver 2 checks to see whether it is holding the same shared data as that being held by the transmitter 1.

Figure 14:
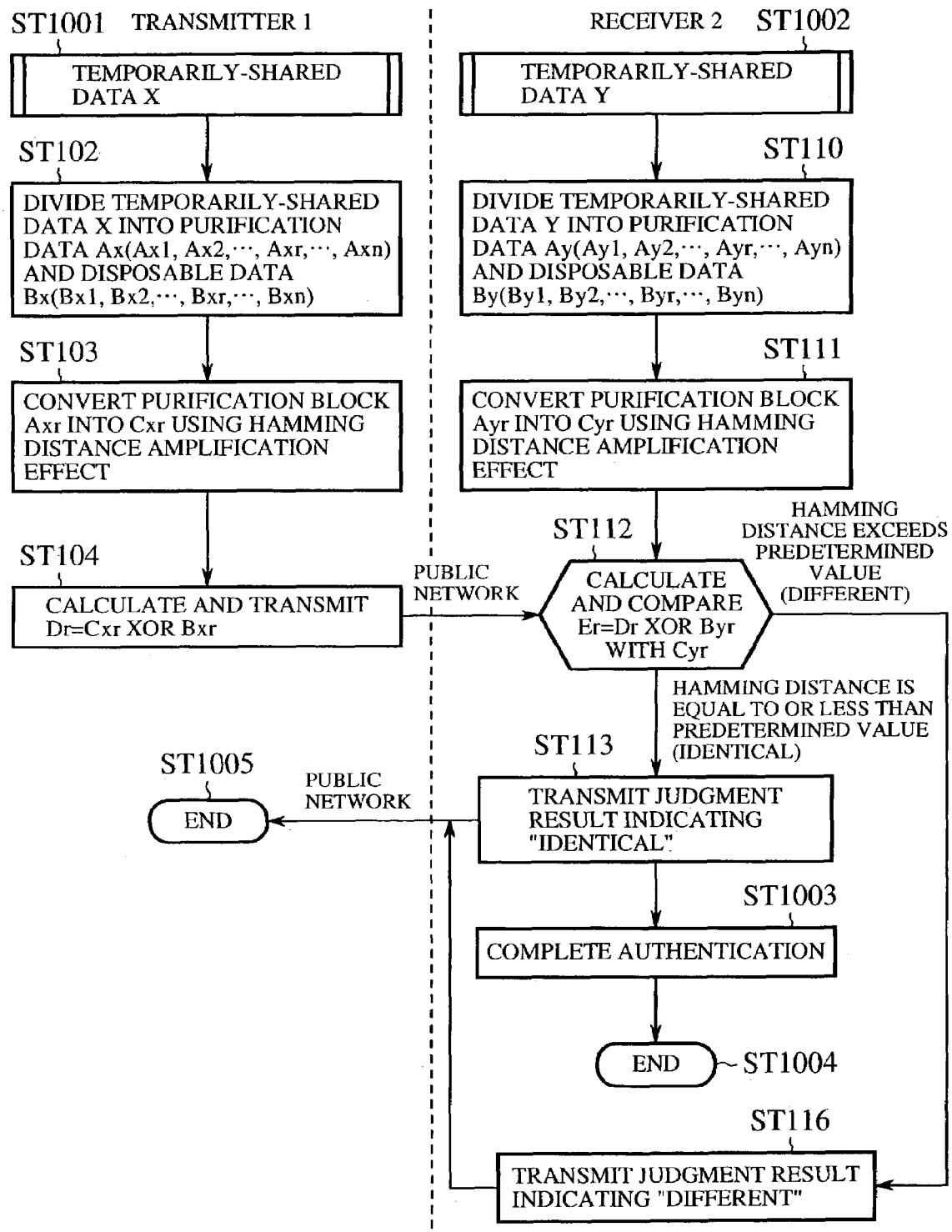
FIG. 14 is a flow chart showing an operation of the shared data purifying system in accordance with embodiment 6 of the present invention.

FIG. 13 is a diagram showing the shared data purifying system in accordance with this embodiment, and FIG. 14 is a flow chart showing an operation of the shared data purifying system. In FIGS. 13 and 14, because the components and steps designated by the same reference numerals as shown in FIGS. 1 and 3 and as explained in Embodiment 1 are the same as those of embodiment 1, the detailed explanation of those components and steps will be omitted hereafter.

The shared data purifying system shown in FIG. 13 is the same as that of embodiment 1 as shown in FIG. 1, with the exception that the shared data purifying system of this embodiment does not include a quantum communication line 3.

In FIG. 14, the transmitter 1 and the receiver 2, in steps 1001 and 1002, acquire temporarily-shared data X and temporarily-shared data Y, respectively. Hereafter, assume that there exists a data supply apparatus not shown in the figure, for example, identical data are supplied to both the transmitter 1 and to the receiver 2 as the temporarily-shared data X and the temporarily-shared data Y from this data supply apparatus and are stored in a data storage means X 13 and in a data storage means Y 23, respectively.

Because there is a possibility that these temporarily shared-data X and temporarily-shared data Y are not completely identical with each other because of errors or the like that occurs on a transmission path from the data supply apparatus, they are called, "temporarily-shared data".

In accordance with the present invention, the temporarily-shared data X is second temporarily-shared data and the temporarily-shared data Y is first temporarily-shared data, and the receiver 2 is a shared data purifying apparatus.

After that, the transmitter carries out processes of steps 102, 103 and 104, like that of embodiment 1, and transmits a transmission block Dr generated in step 104 to the receiver 2.

The receiver 2 carries out processes of steps 110, 111 and 112, like that of embodiment 1, and, in step 112, generates a made-for-verification block Er and compares it with a mixed block Cyr generated in step 111.

When the Hamming distance between the mixed block Cyr and the made-for-verification block Er exceeds a predetermined value, in step 112, the receiver 2, in step 116, transmits information indicating "they are different from each other" to the transmitter 1 as a judgment result through a public network.

When the judgment result indicates "they are different from each other", each of the transmitter 1 and the receiver 2 receives a supply of data from the data supply apparatus again and repeats the above-mentioned processing until the judgment result indicates "they are identical with each other".

When the Hamming distance between the mixed block Cyr and the made-for-verification block Er is equal to or less than the predetermined value, in step 112, the receiver 2, in step 113, transmits information indicating "they are identical with each other" to the transmitter 1 as the judgment result through the public network.

Because the transmitter 1 and the receiver 2 share the same data with each other when the judgment result indicates "they are identical with each other", the transmitter can carry out cryptography communications by using this shared data as a key for common key encryption systems, for example.

As mentioned above, because the receiver according to this embodiment checks to see whether the temporarily-shared data that is temporarily shared with the transmitter is identical with the temporarily-shared data being held by the transmitter, the receiver can be called either a shared data verification apparatus or a shared data authentication apparatus.

Furthermore, in accordance with this embodiment, each of the transmitter and the receiver (i.e., the shared data purifying apparatus) divides the temporarily-shared data into a plurality of purification blocks and a plurality of disposable blocks, and enlarges the Hamming distance between corresponding purification blocks being held by the transmitter and the receiver by using a Hamming distance amplification effect, like that of embodiment 1. As a result, the present embodiment offers an advantage of easily judging whether the temporarily-shared data stored in the transmitter is identical with or different from that stored in the receiver.

In accordance with this embodiment, data other than the temporarily-shared data are sent and received by way of the public network. In accordance with the present invention, the line via which data other than the temporarily-shared data are sent and received is not limited to the public network. As an alternative, data other than the temporarily-shared data can be sent and received by way of a privately used line or by radio.

Furthermore, in accordance with this embodiment, when generating and Vernam-encrypting an error correction code, the transmitter selects the smallest one of the numbers of blocks which have already been completely shared between the transmitter and the receiver as data for encryption. However, in accordance with the present invention, the selected number is not limited to the smallest one of the numbers of blocks which have already been completely shared between the transmitter and the receiver as data for encryption. As an alternative, the transmitter can select either one of the numbers of blocks which have already been completely shared between the transmitter and the receiver. In this case, both the transmitter and the receiver use blocks of the same number (these blocks having the same bit number as that of the error correction code).

INDUSTRIAL APPLICABILITY

As mentioned above, the shared data purifying apparatus and shared data purifying method in accordance with the present invention are suitable for reducing the risk of temporarily-shared data being tapped and enlarging the ratio of effective data when removing errors from the data temporarily shared between the transmitter and the receiver.

The invention claimed is:

1. A shared data purifying apparatus comprising:
a block generating means for dividing temporarily-shared data that said shared data purifying apparatus temporarily shares with a transmitter according to a predetermined division rule so as to generate a first purification block and a first disposable block;
a data mixing means for mixing the first purification block according to a predetermined data mixing rule so as to generate a first mixed block, according to the predetermined data mixing rule said data mixing means mixing each of two arbitrary digital data that are at a Hamming distance of 0 from each other so that two generated mixed data are at a Hamming distance of 0 from each other, and mixing each of two arbitrary digital data that are at a Hamming distance of 1 or more from each other so that two generated mixed data are at a have a Hamming distance of 1 or more from each other;
a means for acquiring an encrypted block generated according to a predetermined encryption rule based on a second mixed block, which is generated by mixing a second purification block, which said transmitter generates together with a second disposable block by dividing temporarily-shared data being held by said transmitter according to the predetermined division rule, according to the predetermined data mixing rule, and based on the second disposable block;
a decrypted block generating means for decrypting the encrypted block with the first disposable block according to a predetermined decrypting rule corresponding to the predetermined encryption rule so as to generate a decrypted block; and
an identity judgment means for comparing the decrypted block with the first mixed block so as to judge whether the first purification block and the second purification block are identical with or different from each other according to a comparison result.

2. The shared data purifying apparatus according to claim 1, wherein said transmitter transmits the temporarily-shared data to said shared data purifying apparatus.

3. The shared data purifying apparatus according to claim 2, wherein said transmitter transmits the temporarily-shared data to said shared data purifying apparatus through quantum cryptography communications.

4. The shared data purifying apparatus according to claim 2, further comprising an error correcting means, wherein said decrypted block generating means acquires correction information used to make the first purification block, which said transmitter generates as well as the encrypted block, agree with the second purification block, and said identity judgment means compares the decrypted block with the first mixed block and judges that the first purification block is different from the second purification block when the comparison result indicates that a Hamming distance between the decrypted block and the first mixed block exceeds a predetermined value, and, when a judgment result from said identity judgment means indicates that the first purification block is different from the second purification block, said error correcting means corrects the first purification block based on the correction information so that the first purification block agrees with the second purification block.

5. The shared data purifying apparatus according to claim 2, wherein the first disposable block, the second mixed block, and the second disposable block are equal in bit number, and the predetermined encryption rule is a rule according to which said apparatus implements an exclusive-OR operation on the second mixed block and the second disposable block and the predetermined decrypting rule is a rule according to which said decrypted block generating means implements an exclusive-OR operation on the encrypted block and the first disposable block.

6. The shared data purifying apparatus according to claim 2, wherein the predetermined data mixing rule is a rule according to which said data mixing means mixes the first purification block so that a Hamming distance between the first and second mixed blocks is larger than that between the first and second purification blocks when the Hamming distance between the first and second purification blocks is 1 or more and is sufficiently less than one half of a bit number of each of the first and second purification blocks.

7. The shared data purifying apparatus according to claim 2, wherein the predetermined data mixing rule is a hash function.

8. The shared data purifying apparatus according to claim 1, further comprising a data storage means, wherein said identity judgment means compares the decrypted block with the first mixed block, and judges that the first purification block is identical with the second purification block and stores the first purification block in said data storage means when a Hamming distance between the decrypted block and the first mixed block is equal to or less than a predetermined value.

9. The Shared data purifying apparatus according to claim 1, further comprising an error correcting means, wherein said identity judgement means compares the decrypted block with the first mixed block and judges that the first purification block is different from the second purification block when the comparison result indicates that a Hamming distance between the decrypted block and the first mixed block exceeds a predetermined value, and, when a judgment result from said identity judgment means indicates that the first purification block is different from the second purification block, said error correcting means acquires correction information used to make the first purification block agree with the second purification block, and corrects the first purification block based on the correction information so that the first purification block agrees with the second purification block.

10. The shared data purifying apparatus according to claim 9, wherein the correction information is an error correction code for the second purification block, and said error correcting means corrects the first purification block with the error correction code.

11. The shared data purifying apparatus according to claim 9, wherein said apparatus encrypts the correction information by implementing an exclusive-OR operation on the correction information and data being held by both said transmitter and a data storage means, and said error correcting means acquires and decrypts the encrypted correction information by implementing an exclusive-OR operation on this encrypted correction information and the data acquired from said data storage means, and corrects the first purification block based on the decrypted correction information so that the first purification block agrees with the second purification block.

12. The shared data purifying apparatus according to claim 9, wherein said apparatus obtains the correction information by implementing an exclusive-OR operation on equal halves into which the second purification block is divided, and said error correcting means generates comparison information that is a result of an exclusive-OR operation implemented on equal halves into which the first purification block is divided, estimates bit positions at where the first and second purification blocks disagree from the correction information and the comparison information, and corrects the first purification block so that the first purification block agrees with the second purification block by inverting bits of the first purification block at the estimated bit positions.

13. The shared data purifying apparatus according to claim 1, wherein the first disposable block, the second mixed block, and the second disposable block are equal in bit number, and the predetermined encryption rule is a rule according to which said apparatus implements an exclusive-OR operation on the second mixed block and the second disposable block and the predetermined decrypting rule is a rule according to which said decrypted block generating means implements an exclusive-OR operation on the encrypted block and the first disposable block.

14. The shared data purifying apparatus according to claim 1, wherein the predetermined data mixing rule is a rule according to which said data mixing means mixes the first purification block so that a Hamming distance between the first and second mixed blocks is larger than that between the first and second purification blocks when the Hamming distance between the first and second purification blocks is 1 or more and is sufficiently less than one half of a bit number of each of the first and second purification blocks.

15. The shared data purifying apparatus according to claim 1, wherein the predetermined data mixing rule is a hash function.

16. A shared data purifying method for use in a shared data purifying system including a transmitter and a receiver, comprising:

each of said transmitter and said receiver using a predetermined data mixing rule;

said transmitter transmitting temporarily-shared data to said receiver;

said receiver dividing the temporarily-shared data received thereby according to a predetermined division rule so as to generate a first purification block and a first disposable block;

said receiver mixing the first purification block according to the predetermined data mixing rule so as to generate a first mixed block;

said transmitter dividing the temporarily-shared data transmitted thereby according to the predetermined division rule so as to generate a second purification block and a second disposable block;

said transmitter mixing the second purification block according to the predetermined data mixing rule so as to generate a second mixed block;

said transmitter generating an encrypted block from the second mixed block and the second disposable block according to a predetermined encryption rule and then transmitting the encrypted block to said receiver;

said receiver receiving the encrypted block, decrypting the encrypted block with the first disposable block according to a predetermined decrypting rule corresponding to the predetermined encryption rule so as to generate a decrypted block, comparing the decrypted block with the first mixed block so as to determine whether the first and second purification blocks are identical with or different from each other according to a comparison result, and advancing to either of following (a) and (b) according to a judgment result;

(a) when the judgment result indicates that the first and second purification blocks are identical to each other, transmitting the judgment result indicating the fact to said transmitter and storing the first purification block in a data storage means;

(b) when the judgment result indicates that the first and second purification blocks are different from each other, transmitting the judgment result indicating the fact to said transmitter;

said transmitter advancing to either of following (c) and (d) according to the received judgment result;

(c) when the received judgment result indicates that the first and second purification blocks are identical to each other, finishing processing;

(d) when the received judgment result indicates that the first and second purification blocks are different from each other, generating and transmitting correction information used to make the second purification block agree with the first purification block to said receiver;

said receiver correcting the first purification block by using the correction information received from said transmitter so that the first purification block agrees with the second purification block; and according to the predetermined data mixing rule, mixing each of two arbitrary digital data that are at a Hamming distance of 0 from each other so that two generated mixed data are at a Hamming distance of 0 from each other, and mixing each of two arbitrary digital data that are at a Hamming distance of 1 or more from each other so that two generated mixed data are at a have a Hamming distance of 1 or more from each other.

17. The shared data purifying method according to claim 16, wherein the correction information is obtained by implementing an exclusive-OR operation on equal halves into which the second purification block is divided, and in the correcting said receiver generates comparison information that is a result of an exclusive-OR operation implemented on equal halves into which the first purification block is divided, estimates bit positions in where the first and second purification blocks disagree from the correction information and the comparison information, and corrects the first purification block so that the first purification block agrees with the second purification block by inverting bits of the first purification block at the estimated bit positions.

18. A shared data purifying method for use in a shared data purifying system including a transmitter and a receiver, comprising:

each of said transmitter and said receiver using a predetermined data mixing rule;

said transmitter transmitting temporarily-shared data to said receiver;

said receiver dividing the temporarily-shared data received thereby according to a predetermined division rule so as to generate a first purification block and a first disposable block;

said receiver mixing the first purification block according to the predetermined data mixing rule so as to generate a first mixed block;

said transmitter dividing the temporarily-shared data, which said transmitter has transmitted, according to the predetermined division rule so as to generate a second purification block and a second disposable block;

said transmitter mixing the second purification block according to the predetermined data mixing rule so as to generate a second mixed block;

said transmitter generating correction information used to make the second purification block agree with the first purification block from the second purification block according to a predetermined correction information generation rule;

said transmitter generating an encrypted block from the second mixed block and the second disposable block according to a predetermined encryption rule and then transmitting the encrypted block and the correction information to said receiver;

said receiver receiving the encrypted block, decrypting the encrypted block with the first disposable block according to a predetermined decrypting rule corresponding to the predetermined encryption rule so as to generate a decrypted block, comparing the decrypted block with the first mixed block so as to judge whether the first and second purification blocks are identical with or different from each other according to a comparison result, and advancing to either of following (a) and (b) according to a judgment result;

(a) when the judgment result indicates that the first and second purification blocks are identical with each other, storing the first purification block in a data storage means;

(b) when the judgment result indicates that the first and second purification blocks are different from each other, correcting the first purification block by using the correction information received from said transmitter so that the first purification block agrees with the second purification block; and according to the predetermined data mixing rule, mixing each of two arbitrary digital data that are at a Hamming distance of 0 from each other so that two generated mixed data are at a Hamming distance of 0 from each other, and mixing each of two arbitrary digital data that are at a Hamming distance of 1 or more from each other so that two generated mixed data are at a have a Hamming distance of 1 or more from each other.

19. The shared data purifying method according to claim 18, wherein said receiver has a data storage, means, in the correction information generating step, said transmitter encrypts the generated correction information by implementing an exclusive-OR operation on the correction information and data being held by both said transmitter and said data storage means and then transmits the encrypted correction information to said receiver, and in the error correcting said receiver acquires and decrypts the encrypted correction information by implementing an exclusive-OR operation on this encrypted correction information and the data acquired from said data storage means, and corrects the first purification block based on the decrypted correction information so that the first purification block agrees with the second purification block.

* * * * *

UNITED STATES PATENT AND TRADEMARK OFFICE
CERTIFICATE OF CORRECTION

PATENT NO. : 7,260,222 B2  Page 1 of 1
APPLICATION NO. : 10/363266
DATED : August 21, 2007
INVENTOR(S) : Ishizuka et al.

It is certified that error appears in the above-identified patent and that said Letters Patent is hereby corrected as shown below:

On the title page, the Terminal Disclaimer information should be deleted. Item (45) and the Notice information should read as follows:

--(45) Date of Patent: Aug. 21, 2007

(*) Notice: Subject to any disclaimer, the term of this patent is extended or adjusted under 35 U.S.C. 154(b) by 1016 days.--

On the title page, Item 73, the Assignees information is incorrect. Item (73) should read as follows:

--(73) Assignees: Mitsubishi Denki Kabushiki Kaisha, Tokyo, (JP); National Institute of Information and Communications Technology, Tokyo (JP)--

Signed and Sealed this

Thirtieth Day of June, 2009

JOHN DOLL
*Acting Director of the United States Patent and Trademark Office*